United States Patent [19]
Beckett et al.

[11] Patent Number: 6,025,921
[45] Date of Patent: *Feb. 15, 2000

[54] METHOD AND APPARATUS FOR ENGRAVING A MIXED PATTERN

[75] Inventors: Tony D. Beckett; Kenneth W. Jackson, both of Dayton; David R. Seitz, Vandalia, all of Ohio

[73] Assignee: Ohio Electronics Engravers, Inc., Dayton, Ohio

[*] Notice: This patent is subject to a terminal disclaimer.

[21] Appl. No.: 08/922,087

[22] Filed: Sep. 2, 1997

Related U.S. Application Data

[63] Continuation-in-part of application No. 08/886,488, Jul. 1, 1997, which is a continuation of application No. 08/376,858, Jan. 23, 1995.

[51] Int. Cl.[7] .................................................... H04N 1/21
[52] U.S. Cl. .......................... 358/1.1; 358/299; 358/297; 358/296; 358/448
[58] Field of Search .................................. 358/299, 296, 358/297, 448

[56] References Cited

U.S. PATENT DOCUMENTS

| Re. 23,914 | 12/1954 | Boyajean | 178/6.6 |
|---|---|---|---|
| 2,112,010 | 3/1938 | Brimberg | 178/6.6 |

(List continued on next page.)

FOREIGN PATENT DOCUMENTS

| 0007125 | 1/1980 | European Pat. Off. . |
|---|---|---|
| 0212487 | 3/1987 | European Pat. Off. . |
| 01237140 | 9/1989 | European Pat. Off. . |
| 0473973 | 8/1991 | European Pat. Off. . |

OTHER PUBLICATIONS

Meeting, Sep. 18 & 19, 1996.
"Laserstream Update", Think Laboratory Japan, Gravure Cylinder Manufacture, Mar. 1995, Cooper and Turner Pty. Limited, Unit 1, 55–65 Grandview Street, Pymble NSW 2073, Australia.

(List continued on next page.)

*Primary Examiner*—Edward L. Coles
*Assistant Examiner*—Coulter Henry
*Attorney, Agent, or Firm*—Jacox Meckstroth & Jenkins

[57] ABSTRACT

This invention relates to an engraving method and apparatus for engraving a cylinder for printing an intaglio pattern on a web of material. The engraver comprises a driver for rotatably driving the cylinder and a controller for controlling the operation of the engraver and for generating an intaglio engraving signal corresponding to the predetermined intaglio pattern. The engraver also comprises an engraving head comprising a stylus having a generally flat cutting edge or surface. The engraving head also is capable of engraving at response times of less than 200–300 microseconds, thereby enabling the engraving head to engrave the intaglio pattern on the cylinder during the rotation of the cylinder in response to the intaglio engraving signal. The apparatus and method also comprise a fine line boost routine for facilitating engraving fine areas or lines of the intaglio pattern. There is also provided apparatus and method for controlling ink flow in large engraved areas or intaglio trenches. The apparatus and method facilitate engraving intaglio grooves or trenches which may be generally rectangular in cross section, and which were engraved in response to a pulse-width modulated intaglio engraving signal generated by the controller. In another embodiment of the invention, a system and method or process for engraving a mixed pattern of non-intaglio and intaglio engraved areas is shown. The invention also includes a system and method for engraving mixed patterns of intaglio and non-intaglio areas. In this regard, a controller associated with the engraver analyzes the image data and differentiates the non-intaglio data from intaglio data so that it can be signed an appropriate feed rate for the intaglio and non-intaglio patterns. Using the feed rates, the mixed patterns are engraved.

45 Claims, 32 Drawing Sheets

U.S. PATENT DOCUMENTS

| | | | |
|---|---|---|---|
| 2,160,951 | 6/1939 | Alice | 178/13 |
| 2,164,209 | 6/1939 | Howey et al. | 178/5.6 |
| 2,441,651 | 5/1948 | Thompson | 179/100.41 |
| 2,881,246 | 4/1959 | Fairchild | 178/6.6 |
| 2,925,464 | 2/1960 | Raible | 178/6.6 |
| 3,612,753 | 10/1971 | Korman | 178/5.2 A |
| 3,636,251 | 1/1972 | Daly et al. | 178/6.6 B |
| 3,652,992 | 3/1972 | Koll | 340/146.3 B |
| 3,694,570 | 9/1972 | Kotov et al. | 178/6.6 B |
| 3,769,455 | 10/1973 | de Vos et al. | 178/6.6 B |
| 3,770,888 | 11/1973 | de Vos et al. | 178/6.6 B |
| 3,784,739 | 1/1974 | de Vos et al. | 178/6.6 B |
| 3,876,829 | 4/1975 | Schreiber | 178/7.3 D |
| 3,904,816 | 9/1975 | Taudt et al. | 178/6 |
| 3,956,583 | 5/1976 | Pugsley | 178/6.6 R |
| 3,964,382 | 6/1976 | Baar et al. | 101/1 |
| 4,003,311 | 1/1977 | Bardin | 101/426 |
| 4,052,739 | 10/1977 | Wada et al. | 358/299 |
| 4,174,527 | 11/1979 | Schaefer | 358/267 |
| 4,287,537 | 9/1981 | Pfau et al. | 358/299 |
| 4,301,583 | 11/1981 | Poole | 29/121.2 |
| 4,357,633 | 11/1982 | Buechler | 358/299 |
| 4,394,693 | 7/1983 | Shirley | 358/298 |
| 4,450,486 | 5/1984 | Buechler | 358/299 |
| 4,451,856 | 5/1984 | Buechler | 358/299 |
| 4,484,232 | 11/1984 | Gast | 358/299 |
| 4,500,929 | 2/1985 | Buechler | 358/299 |
| 4,503,468 | 3/1985 | Serinken | 358/256 |
| 4,612,584 | 9/1986 | George et al. | 358/299 |
| 4,688,101 | 8/1987 | Doelves et al. | 358/299 |
| 4,805,312 | 2/1989 | Datwyler | 33/18.1 |
| 4,830,552 | 5/1989 | Ryf | 409/103 |
| 5,229,861 | 7/1993 | Nozaka | 358/299 |
| 5,293,426 | 3/1994 | Wouch et al. | 382/1 |
| 5,424,845 | 6/1995 | Holowko et al. | 358/299 |
| 5,438,422 | 8/1995 | Holowko et al. | 358/299 |
| 5,481,366 | 1/1996 | Sakamoto | 358/296 |
| 5,831,745 | 11/1998 | Ogawa | 358/299 |
| 5,892,589 | 4/1999 | Becket et al. | 358/299 |

OTHER PUBLICATIONS

Think Boomerang system, Technical Information, Think Laboratory, Co. Ltd., 610–1 Umebayashu, toyofuta Kashiwa–shu, Chiba Japan, undated.

*Digital Image Processing*, Pratt, Second Edition, John Wiley and Sons, Section 14.5, 1991.

*The Gravure Engraving Manual*, The Gravure Association of America, 1987.

"Latest News From Engraving Maschine Manufacturers", presentation by Bruck–Service Goerz, Christian Stover, ERA Packaging Division Meeting Sep. 18 to 19, 1996.

Think Boomerang System, "Rotogravure Cylinder Making System", undated publication.

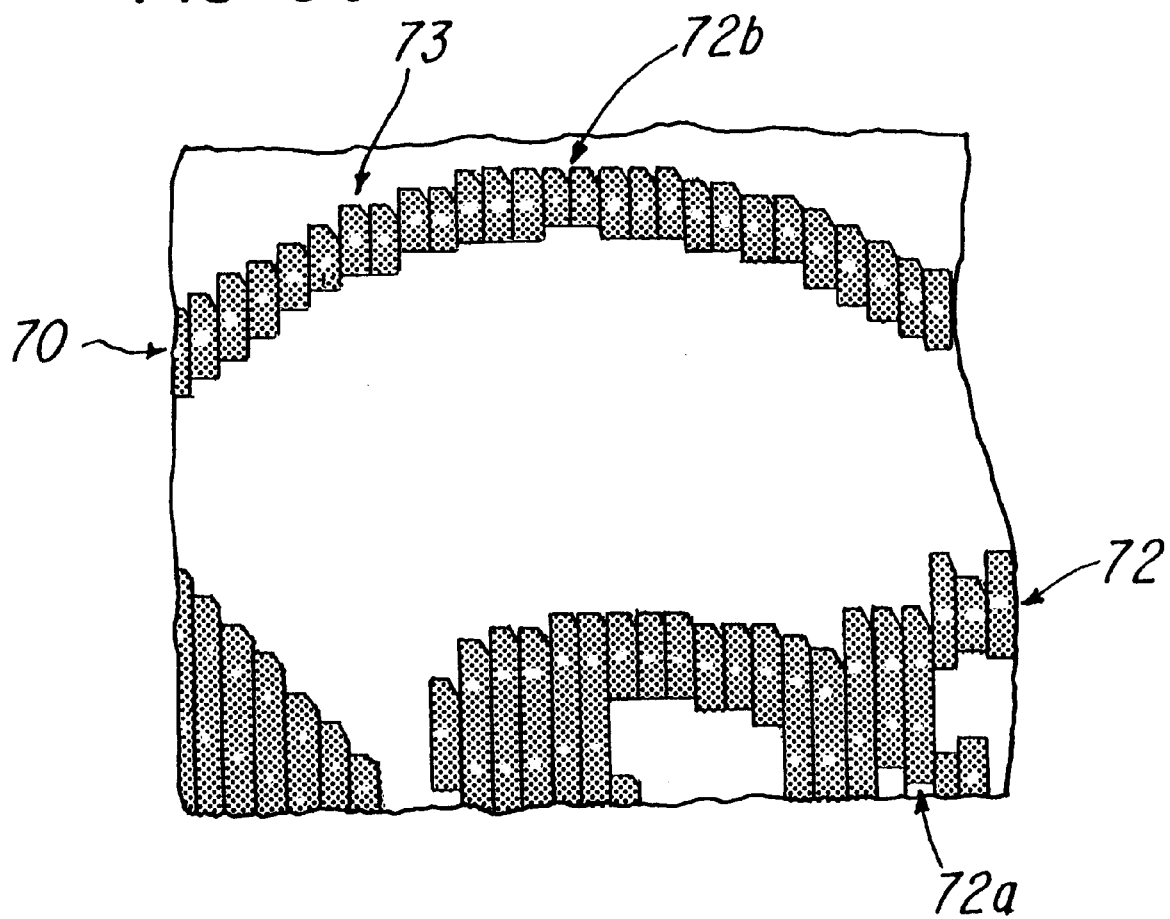

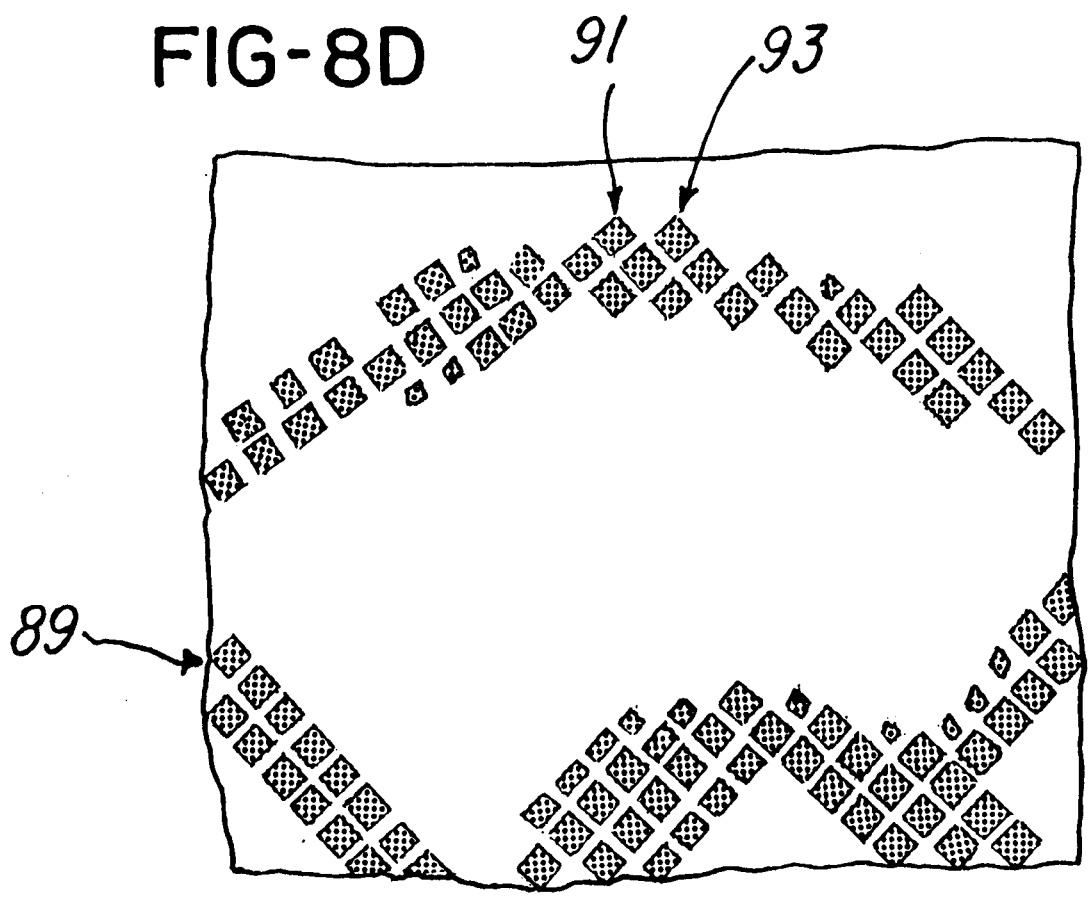

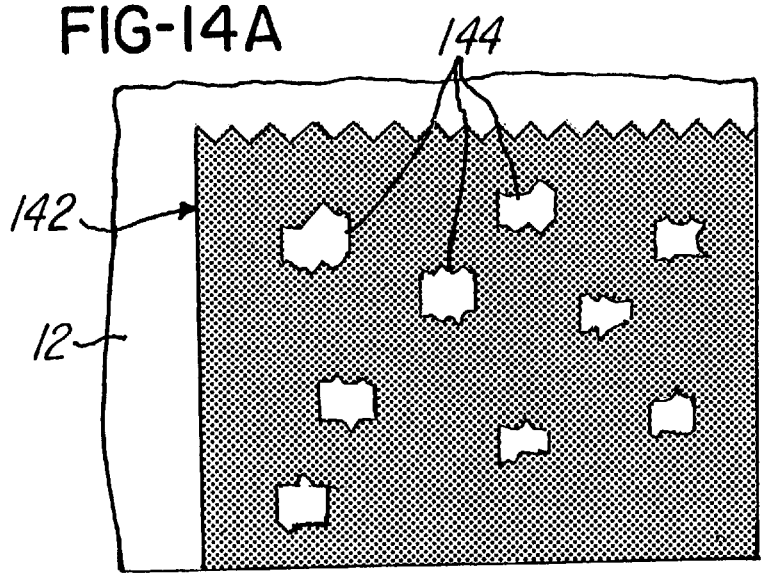
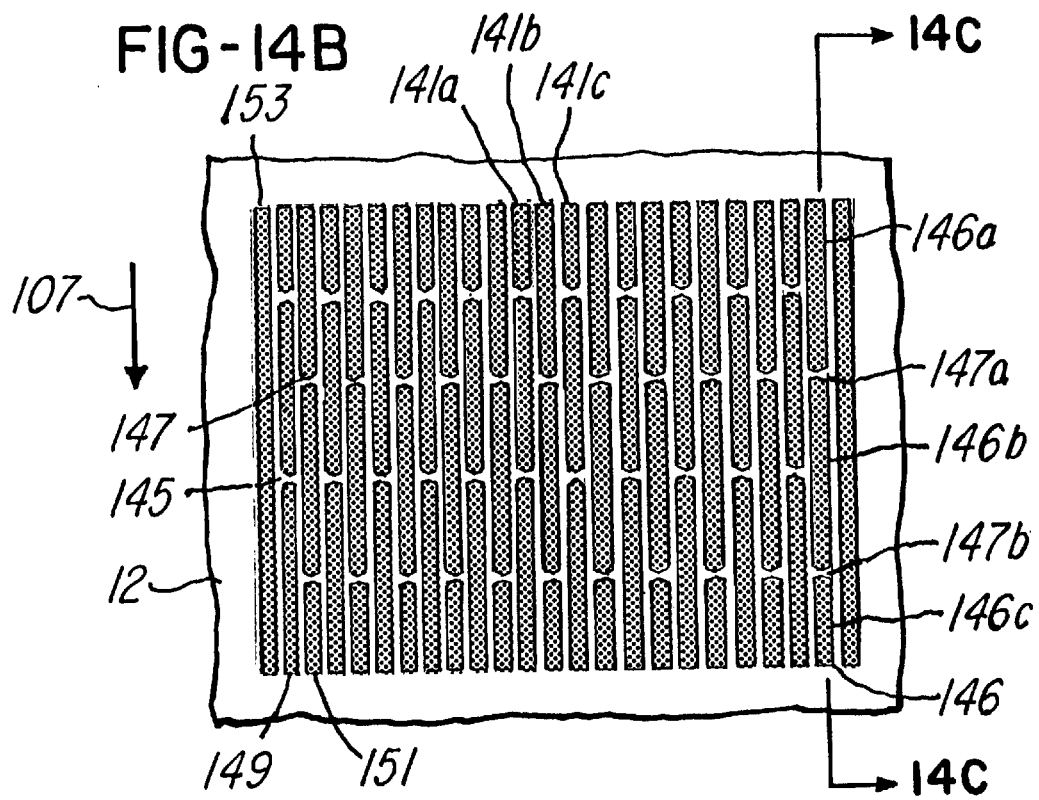
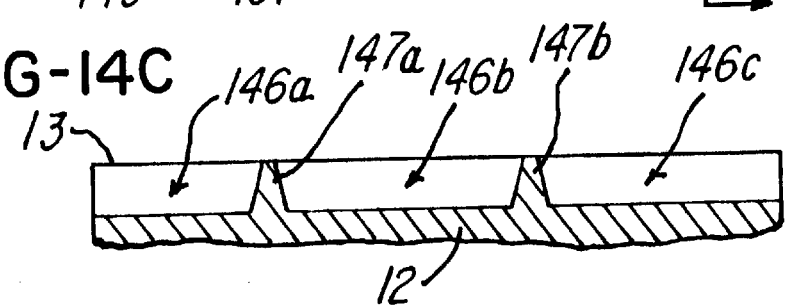

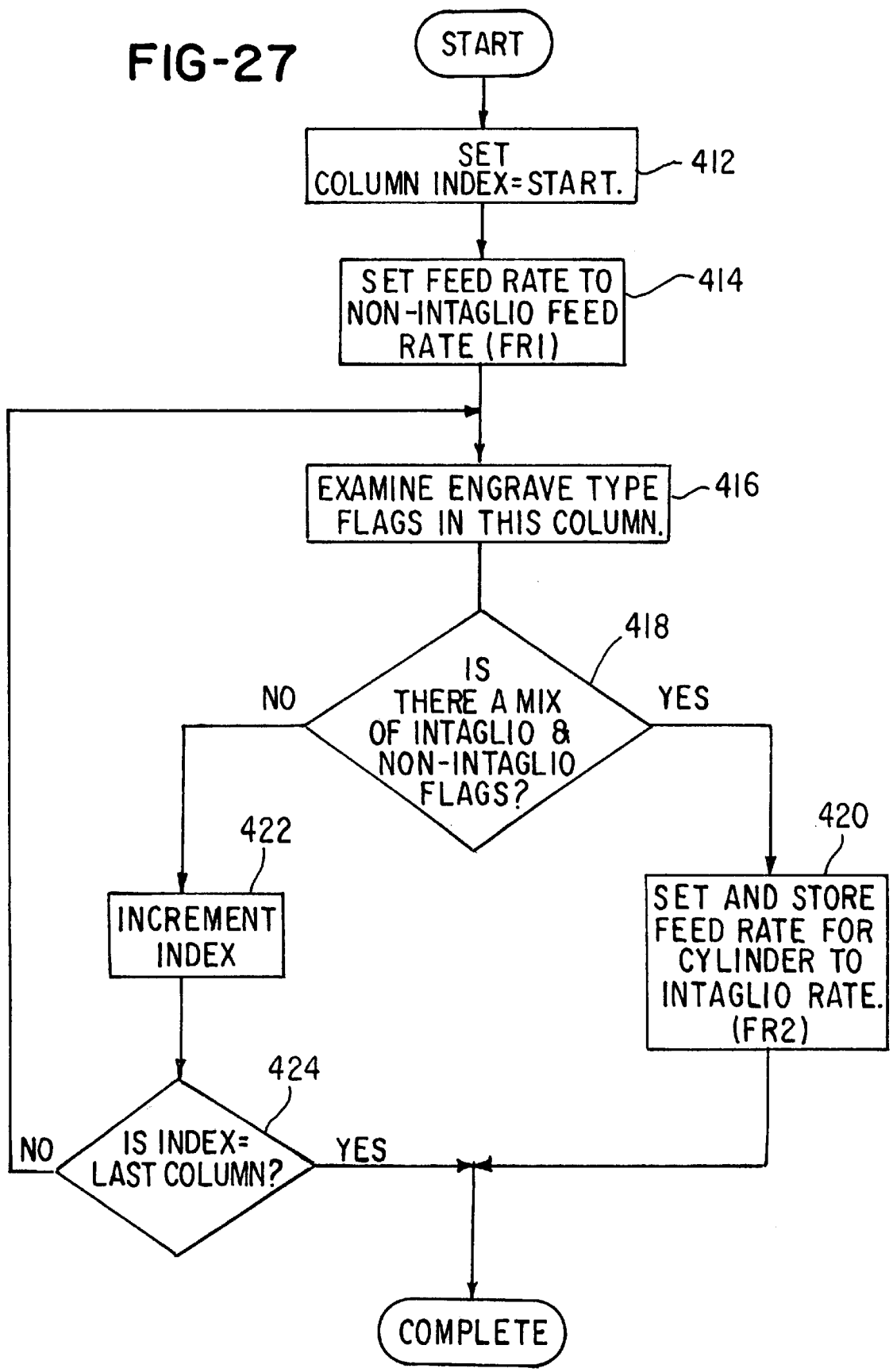

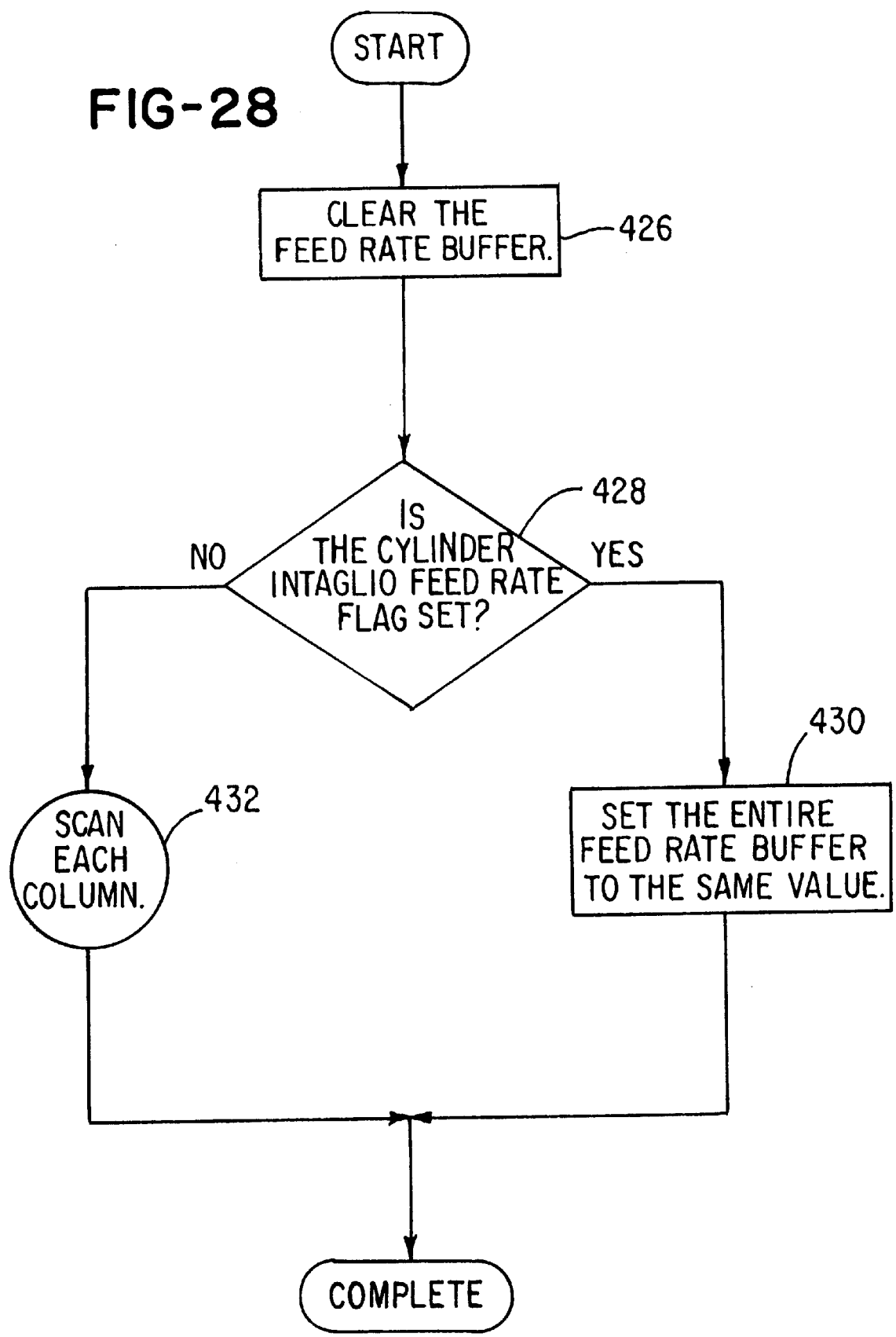

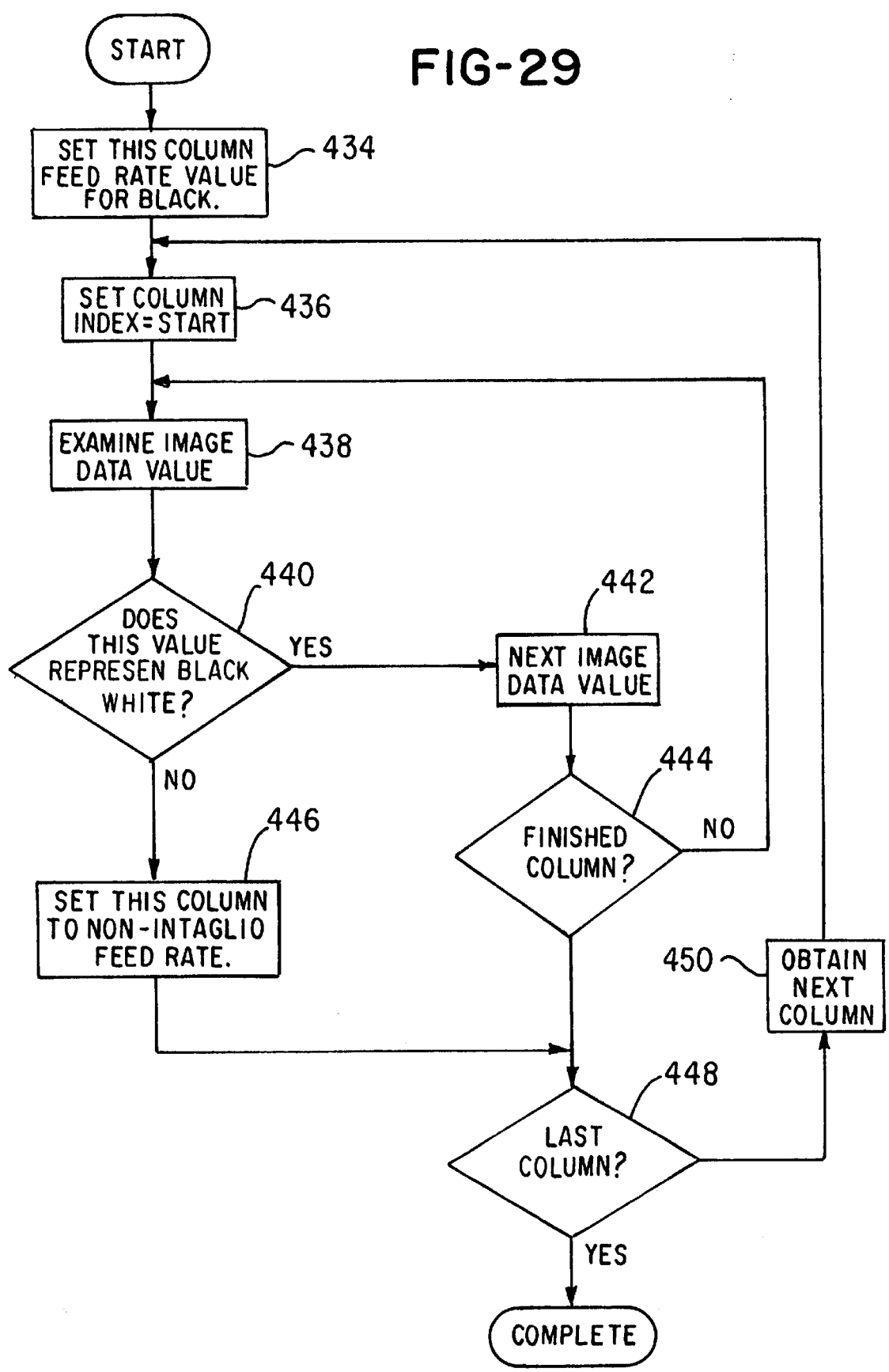

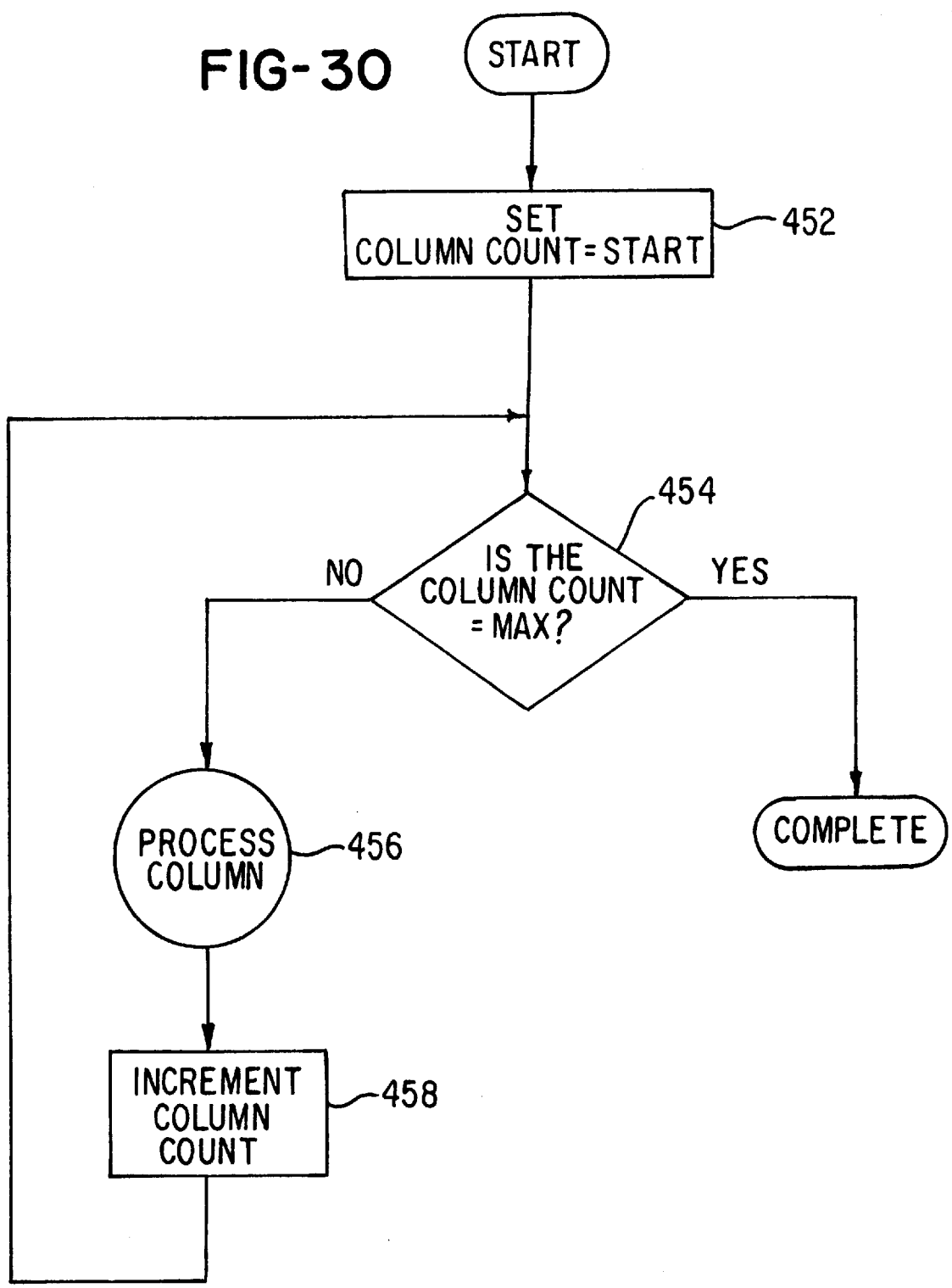

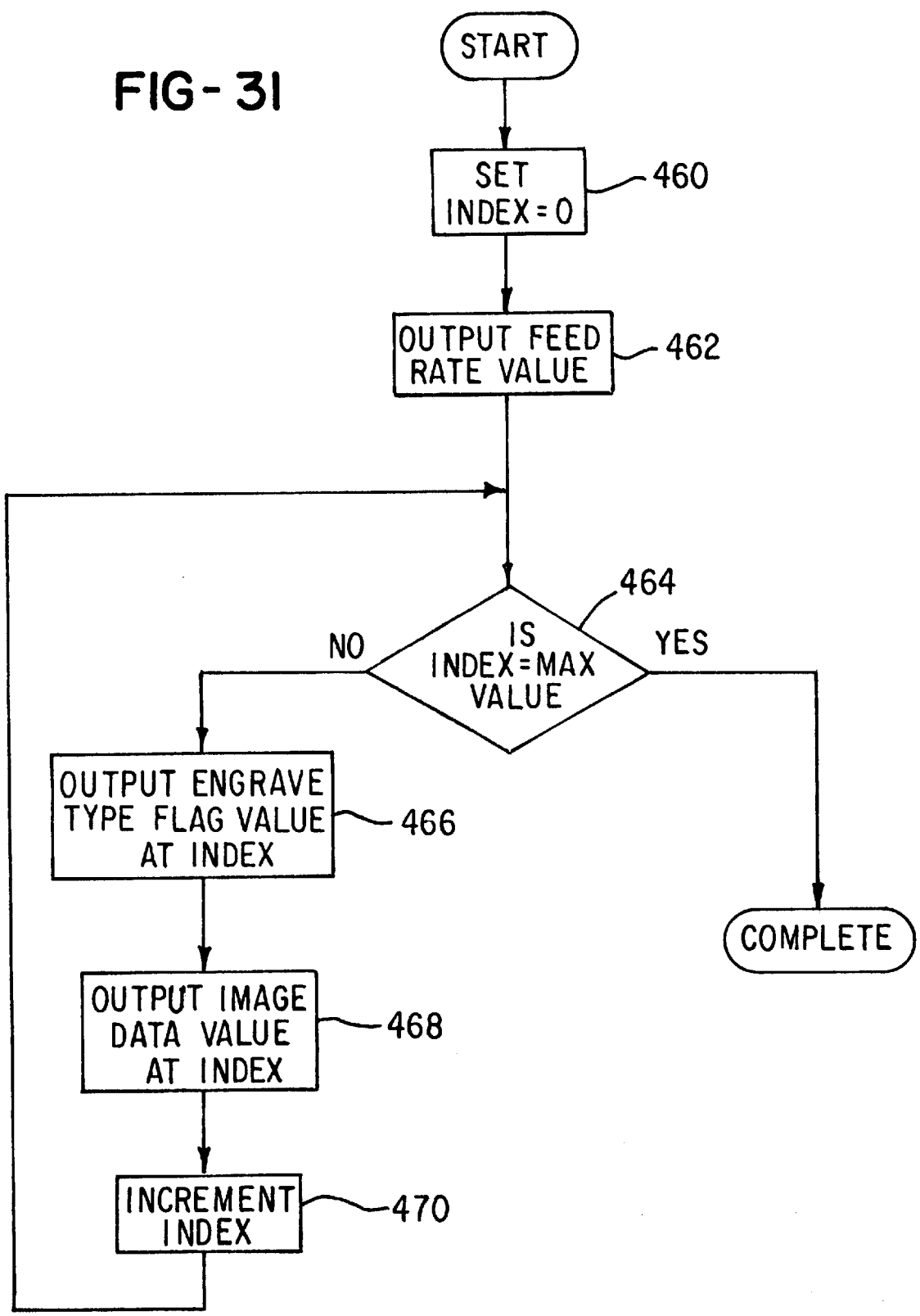

METHOD AND APPARATUS FOR ENGRAVING A MIXED PATTERN

CROSS-REFERENCE TO RELATED APPLICATION

This application is a continuation-in-part of application Ser. No. 08/886,488, filed Jul. 1, 1997, which is a continuation of Ser. No. 08/376,858 filed Jan. 23, 1995.

1. FIELD OF THE INVENTION

This invention relates to engraving and, more particularly, to an intaglio engraving method and apparatus not previously known.

BACKGROUND OF THE INVENTION

In some areas of the printing industry, there is a need and, perhaps, a requirement that printed images have great detail. Such images are often printed with one or more very fine lines using intaglio printing plates. For example, the currency of most countries as well as many securities and other important documents are printed using intaglio printing plates.

In the past, intaglio printing was typically performed using intaglio printing plates which were flat. The intaglio printing plates consisted of lines or dots recessed below the surface of the plates. The intaglio printing plates were usually engraved by hand and, consequently, were very time consuming to engrave. Also, it was very difficult and time consuming to generate identical plates for multi-color printing processes since the intaglio printing plates were engraved manually.

Attempts have been made in the past to automate the manufacture of the intaglio printing plates by engraving the intaglio images on cylinders. For example, attempts have been made to engrave intaglio images on the cylinders using rotogravure engraving equipment. While such rotogravure equipment has been used to engrave cylinders having large cell areas for receiving viscous liquids such as glue, such rotogravure engravers of the past were not suitable for engraving intaglio patterns having one or more fine or thin lines on cylinders used in printing. This is partly because the rotogravure engravers typically engraved cups or cells having a rhomboidal shape similar to the engraved cells shown in FIG. 6A. Also, cells were not generally rectangular or square in cross section, but rather had a more concave shape as shown in FIG. 6B. Thus, sharp contrasts and print densities were difficult to achieve. The engraving heads which engraved those cells typically had a rise time which is the time required to engrave from a white depth to a full black depth. The rise time of prior art engravers was on the order of about 300 microseconds.

The shape of the cells was dictated in part by the shape of a stylus used to engrave the cells and the speed at which the cells were being engraved. A typical stylus of a gravure engraver of the past is shown in FIG. 5. The typical rise time for an engraving head using this stylus was on the order of about 300–400 microseconds. Because of the very slow rise time of the engravers of the past, it was very difficult to engrave relatively thin, deep horizontal lines (i.e., lines which were generally parallel to the axis of the cylinder) or any thin intaglio lines which were not vertical (i.e., generally perpendicular to the axis of the cylinder).

Unfortunately, this rise time was not adequate to perform intaglio engraving because the height of an engraved column or portion of a character (i.e., the portion of the character that was generally parallel to the rotational axis of the cylinder that can be engraved) is limited by the response time of the engraver and associated time T (FIG. 6B) it takes for the engraver to go from a white area X to a full depth black area Y. The height of such a line and the time T is, in turn, inversely related to the speed of the engraving head and the rotational speed of the cylinder. To increase the response time, the rotational engraving speed of the cylinder had to be slowed down. This also meant that the overall time it took to engrave was increased.

Also, intaglio patterns which had large areas engraved on the cylinder did not print well because the flow of ink into and out of the engraved areas was not controlled well.

Thus, the gravure engravers of the past were limited in design and ability when engraving fine line intaglio patterns.

What is needed, therefore, is a method and apparatus capable of engraving intaglio patterns at acceptable engraving speeds.

SUMMARY OF THE INVENTION

It is a primary object of this invention to provide an engraving method and apparatus for engraving an intaglio pattern on a cylinder during the rotation of the cylinder.

It is another object of this invention to provide an intaglio engraver having means for engraving fine lines.

Another object of this invention is to provide an intaglio engraver having means for boosting some or all of an intaglio source data to a resolution which can be engraved by the engraver without disturbing the intaglio source image.

Still another object of this invention is to provide a method and apparatus for controlling ink flow in the intaglio pattern being engraved.

Yet another object of this invention is to provide a method and apparatus for providing an engraving head which is capable of achieving response times of 100 microseconds or less and which uses a stylus having a predetermined or special profile.

In one aspect, this invention comprises a method for engraving a predetermined intaglio pattern on a cylinder for use in a printing press for printing the predetermined intaglio pattern, comprising the steps of rotatably driving the cylinder, generating an intaglio engraving signal generally corresponding to the predetermined intaglio pattern; and engraving the predetermined intaglio pattern on the cylinder in response to the intaglio engraving signal.

In another aspect, this invention comprises a method for engraving a predetermined intaglio pattern on a cylinder for use in a printing press comprising the steps of rotatably mounting the cylinder on an engraver and engraving the predetermined intaglio pattern on the cylinder while the cylinder is rotating.

In still another aspect, this invention comprises an engraver for engraving a cylinder for printing a predetermined intaglio pattern in which a driver for rotatably driving the cylinder and a computer for controlling the operation of the engraver and for generating an intaglio engraving signal corresponding to the predetermined intaglio pattern and an engraving head for engraving the cylinder with predetermined intaglio pattern during the rotation of the cylinder in response to the intaglio engraving signal.

In one aspect, this invention comprises an engraver for engraving a cylinder with a mixed pattern comprising both intaglio engraved areas and non-intaglio engraved areas comprising a driver for rotatably driving the cylinder, a computer for controlling the operation of the engraver and for generating an engraving signal for engraving the mixed engraved pattern and an engraving head coupled to the computer for engraving the cylinder with the mixed engraved pattern in response to the engraving signal as the engraving head is being driven across the cylinder.

In another aspect, this invention comprises a method for engraving a mixed pattern of intaglio engraved areas and non-intaglio engraved areas on a cylinder for use in a printing press for printing the mixed pattern comprising the steps of rotatably driving the cylinder, generating an engraving signal corresponding to the mixed pattern and engraving the mixed pattern on the cylinder in response to the engraving signal.

In yet another aspect, this invention comprises an engraver for engraving a cylinder with a mixed pattern comprising both intaglio engraved areas and non-intaglio engraved areas comprising a drive means for rotatably driving the cylinder, a means for controlling the operation of the engraver and for generating an engraving signal for engraving the mixed engraved pattern, and an engraving means coupled to the computer for engraving the cylinder with the mixed engraved pattern in response to the engraving signal as the engraving head is being driven across the cylinder.

Other objects and advantages of the invention will be apparent from the following description, the accompanying drawings, and the appended claims.

BRIEF DESCRIPTION OF ACCOMPANYING DRAWINGS

Figure 3:
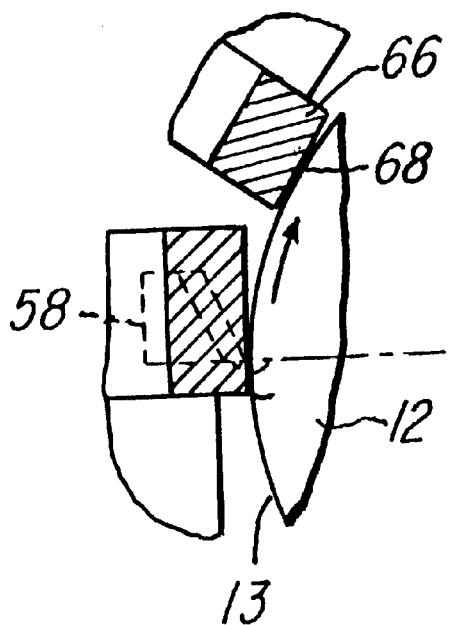
FIG. 3 is a partly broken away sectional view showing an engraving shoe and the stylus in operative relationship with a cylinder.
Figure 7:
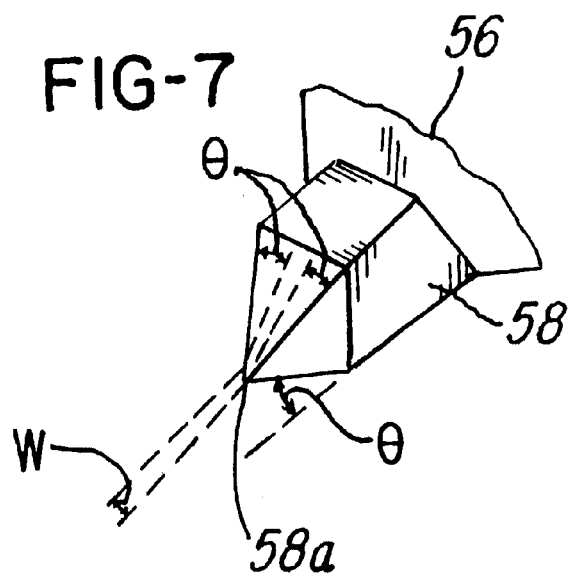
Figure 5:
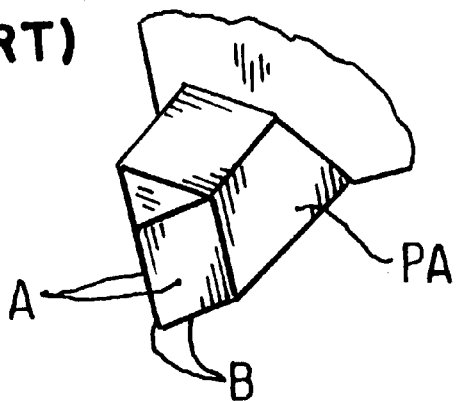
Figure 6A:
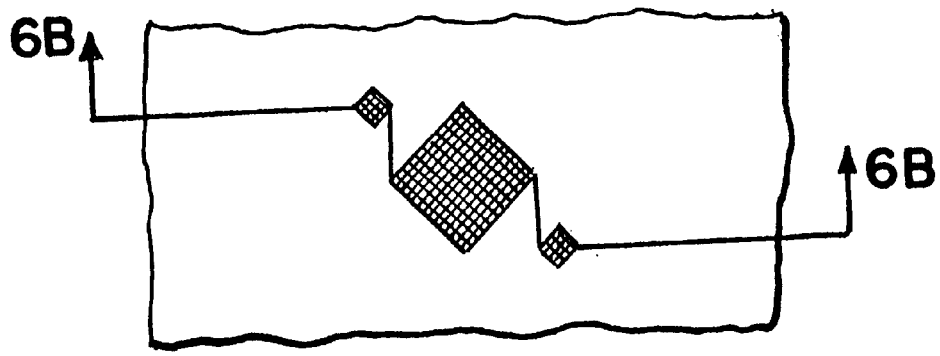
Figure 6B:
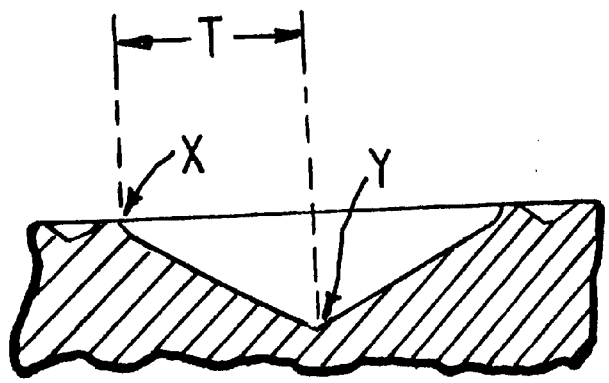
Figure 8A:
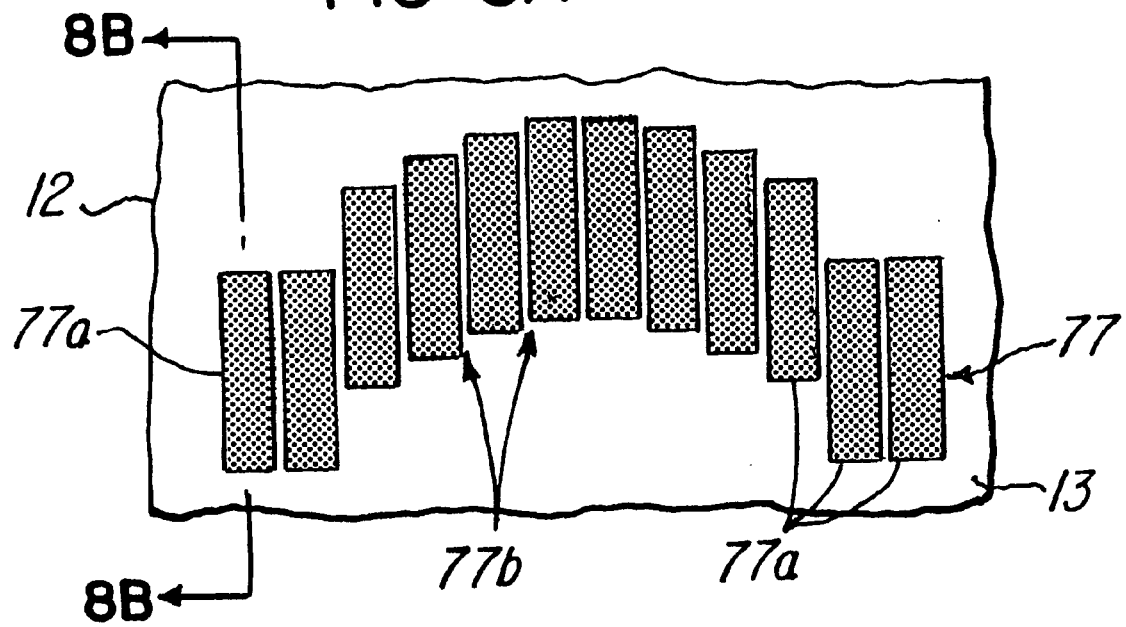
Figure 8B:
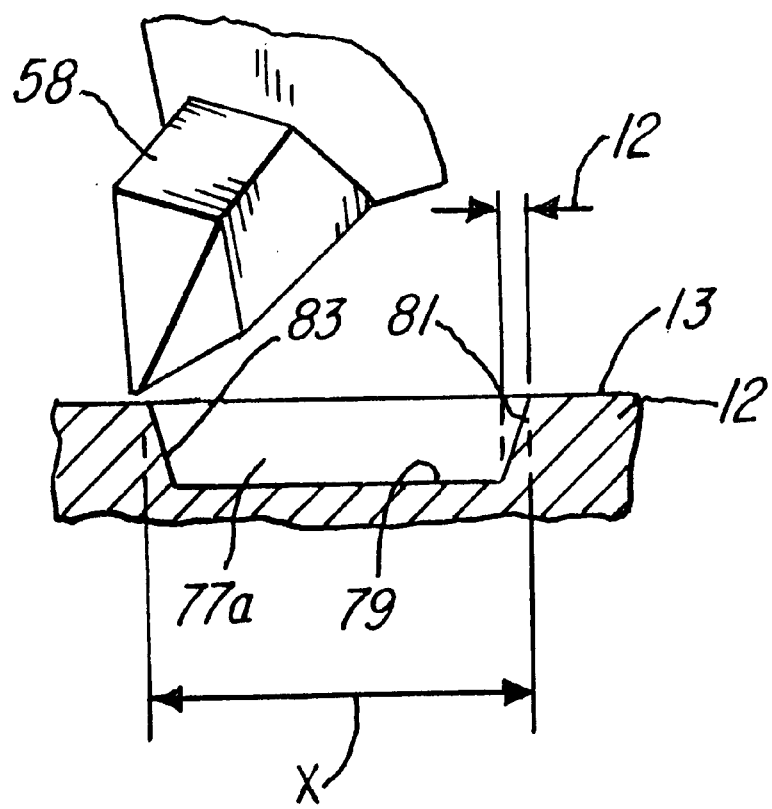
Figure 9A:
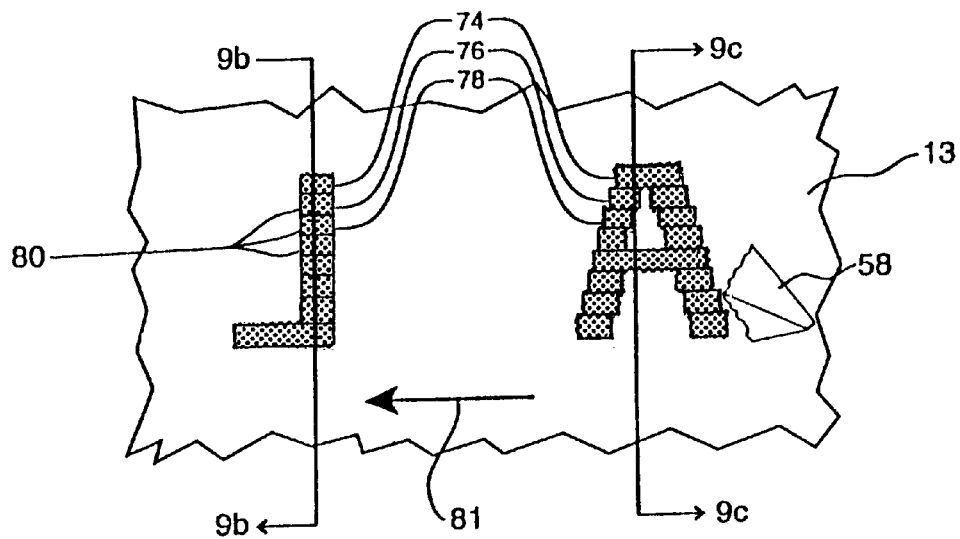
Figure 9B:
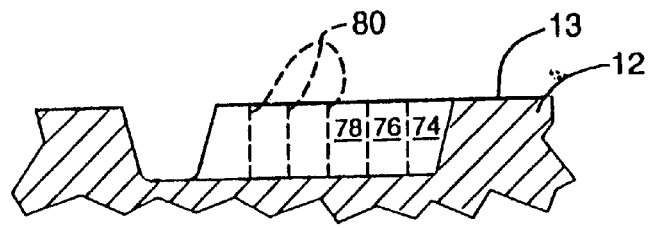
Figure 9C:
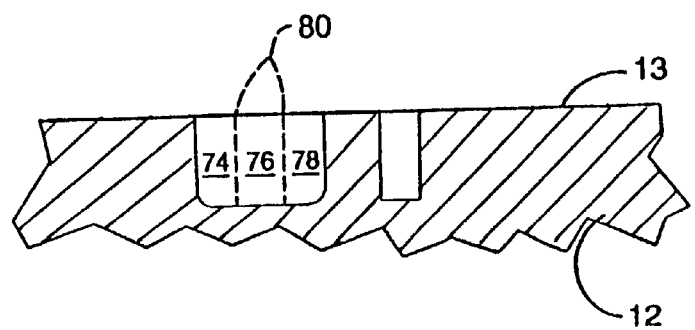
Figure 10A:
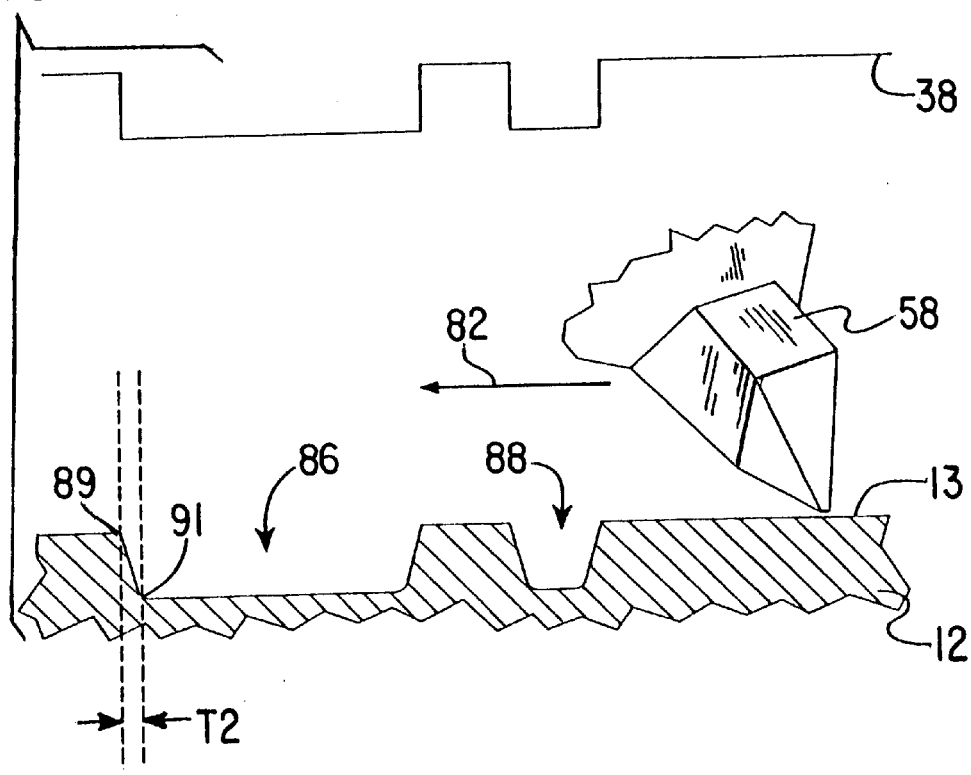
Figure 10B:
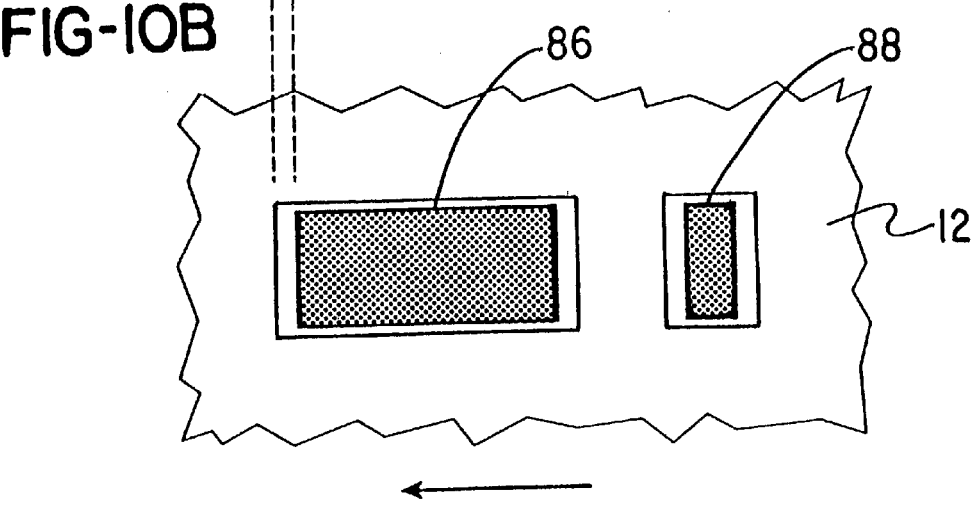
Figure 11:
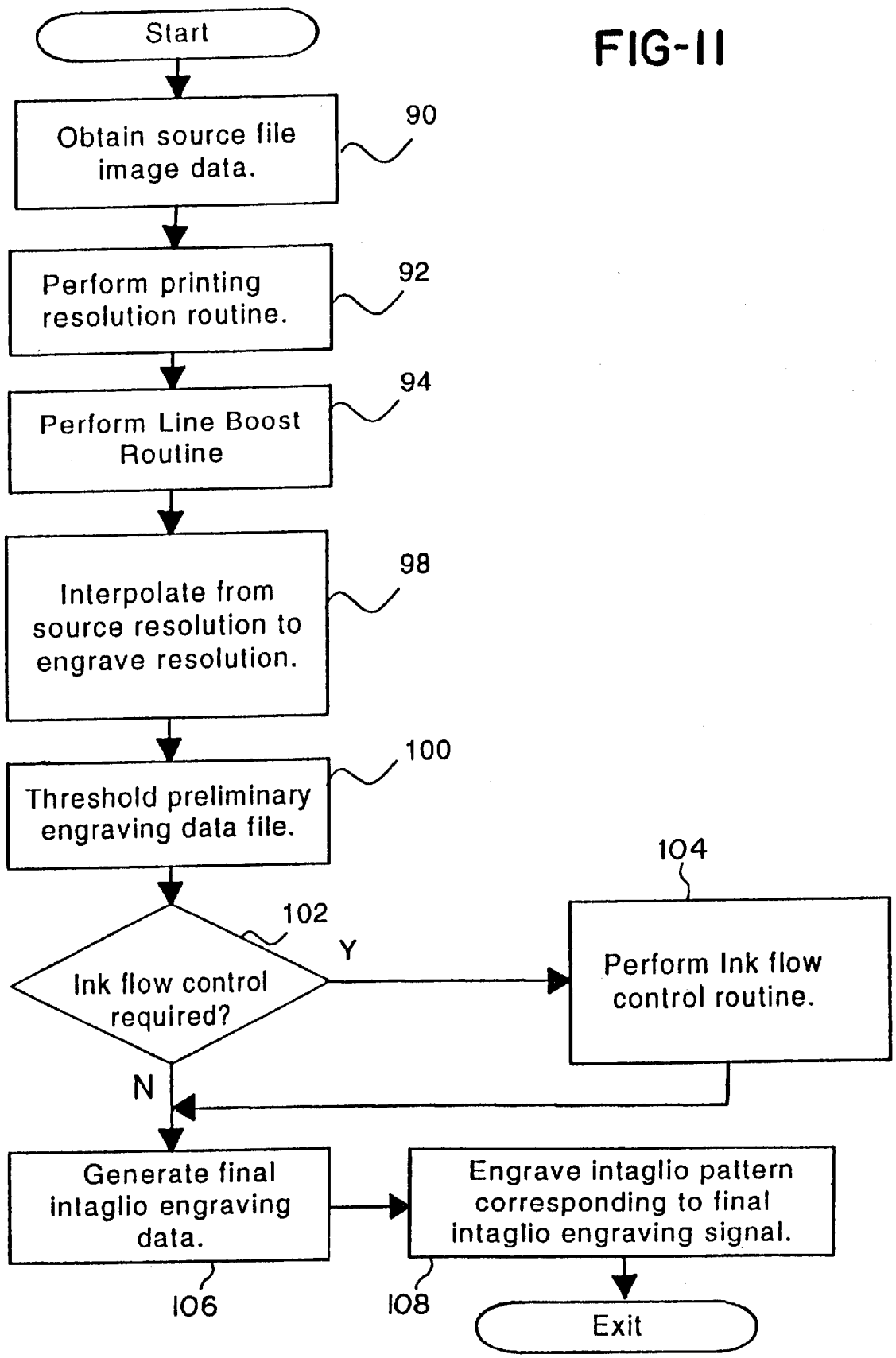
Figure 12:
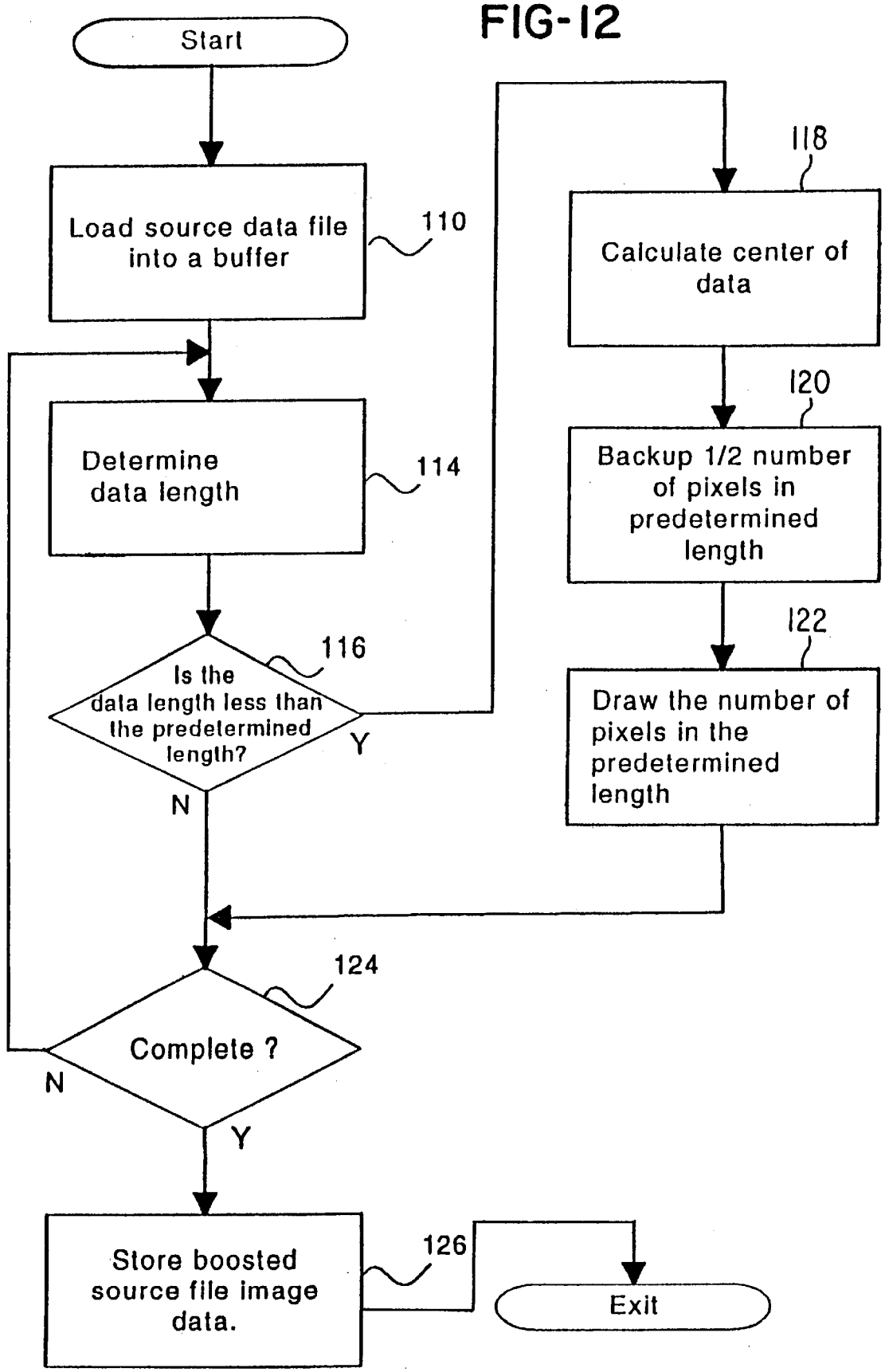
Figure 13A:
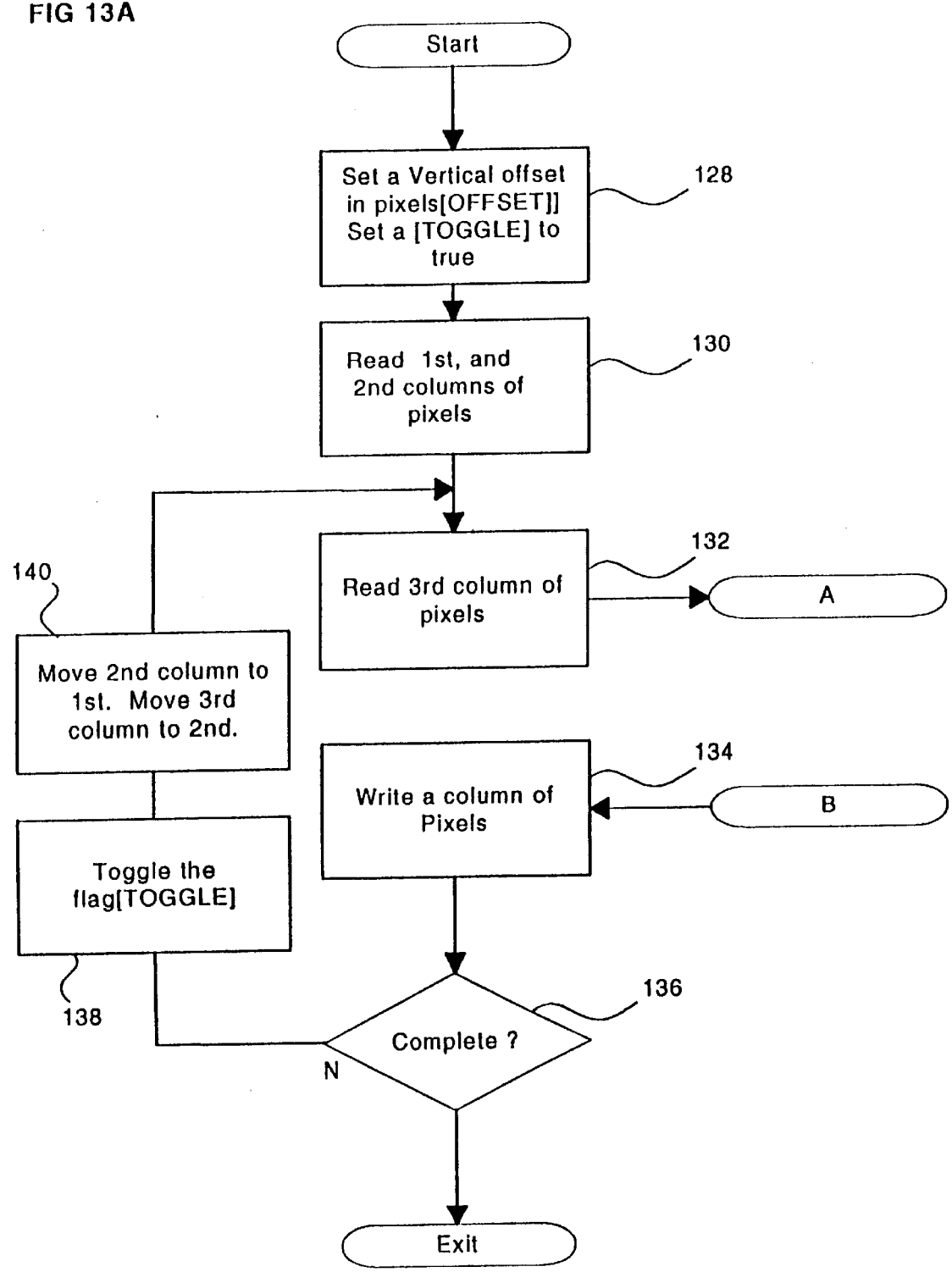
Figure 13B:
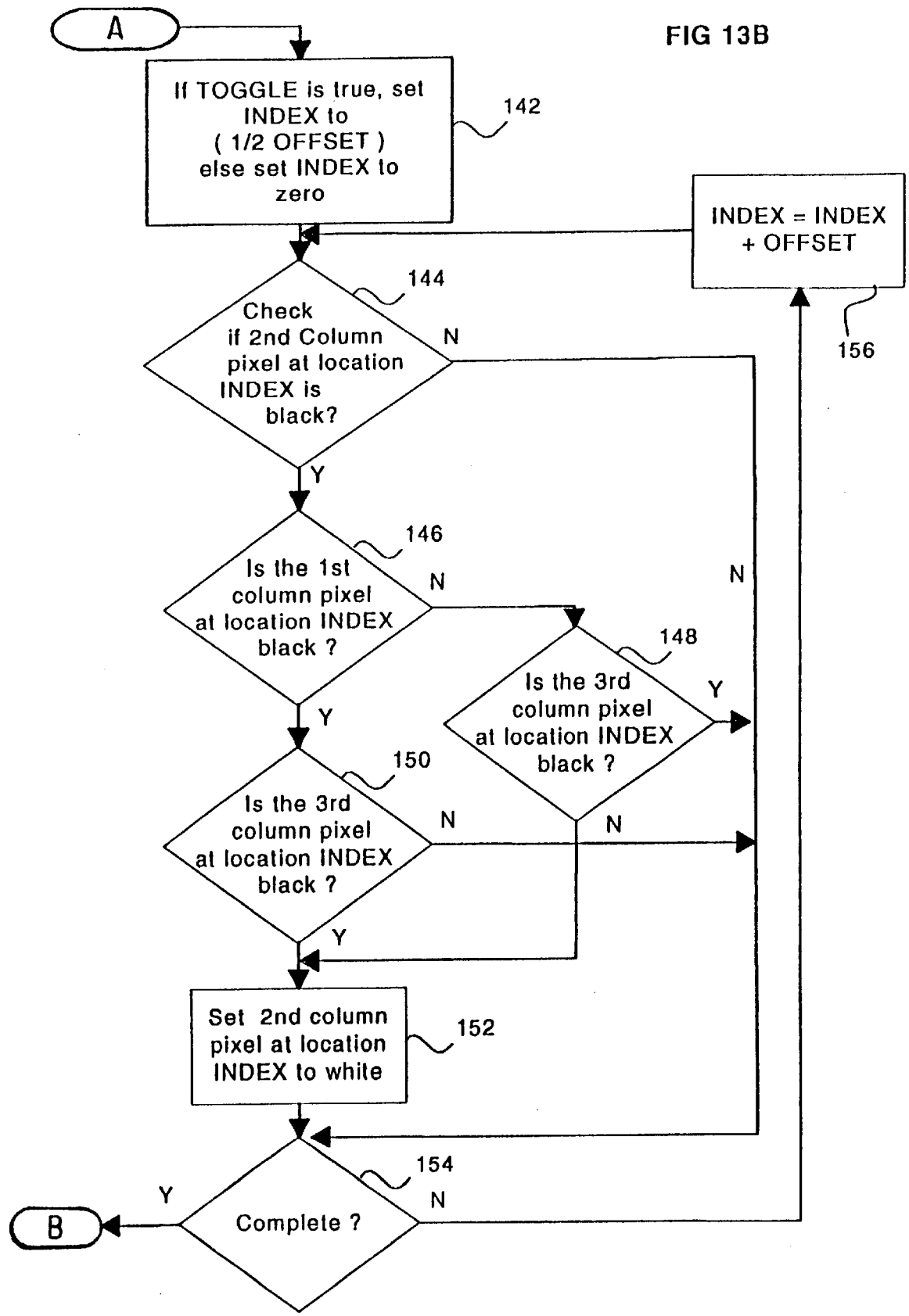
Figure 15A:
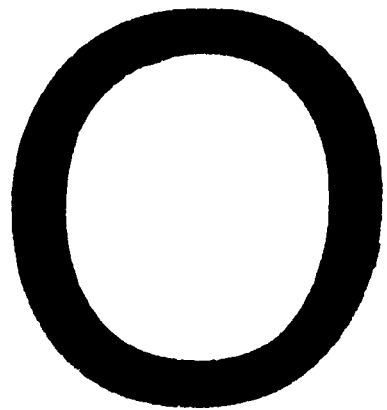
Figure 15B:
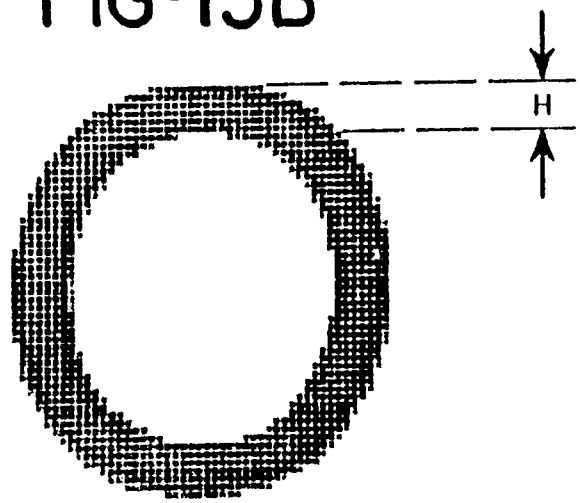
Figure 15C:
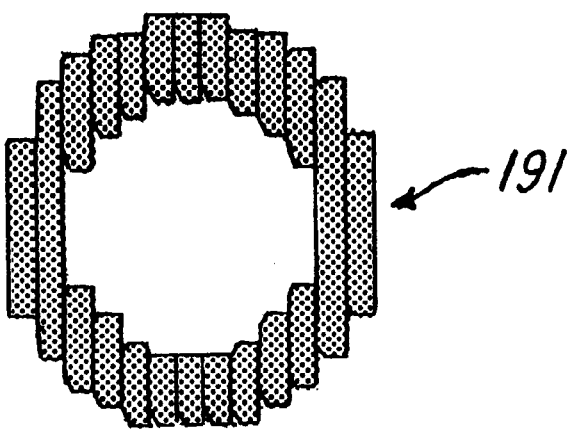
Figure 16A:
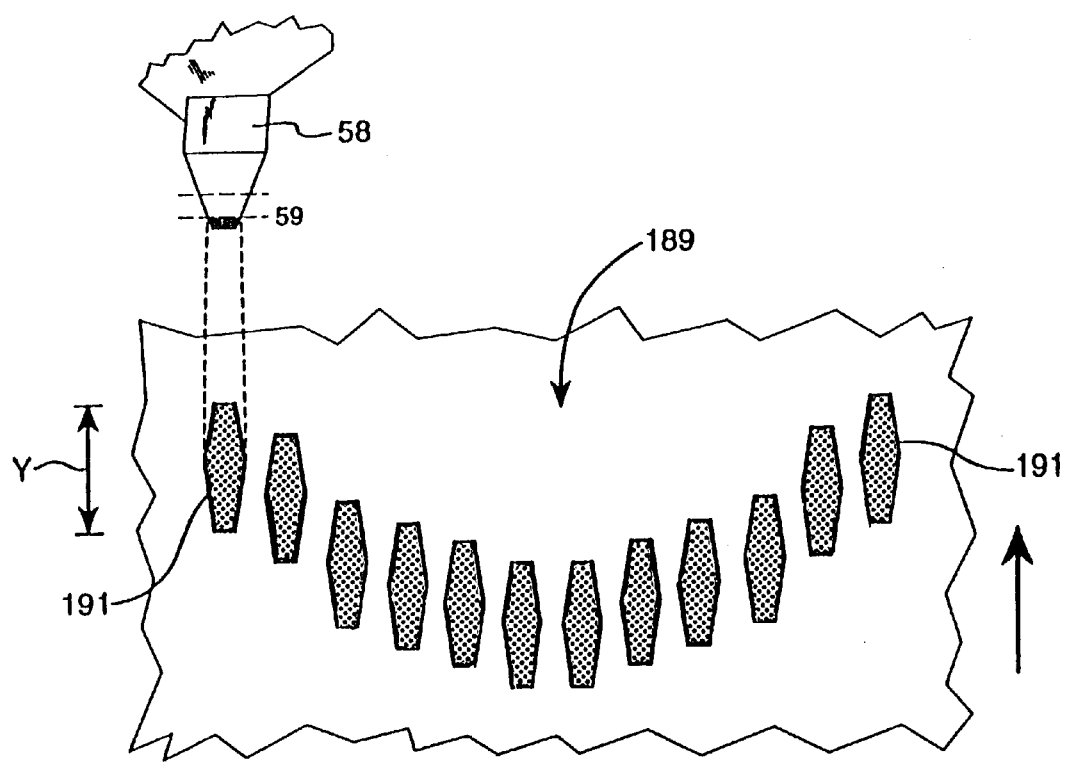
Figure 16B:
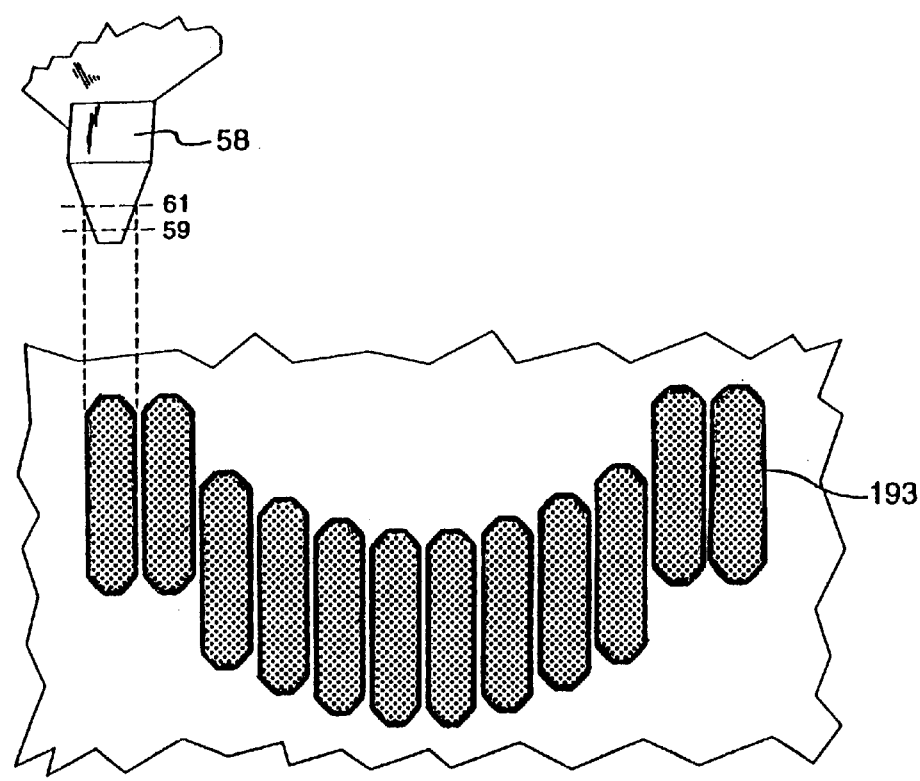
Figure 17:
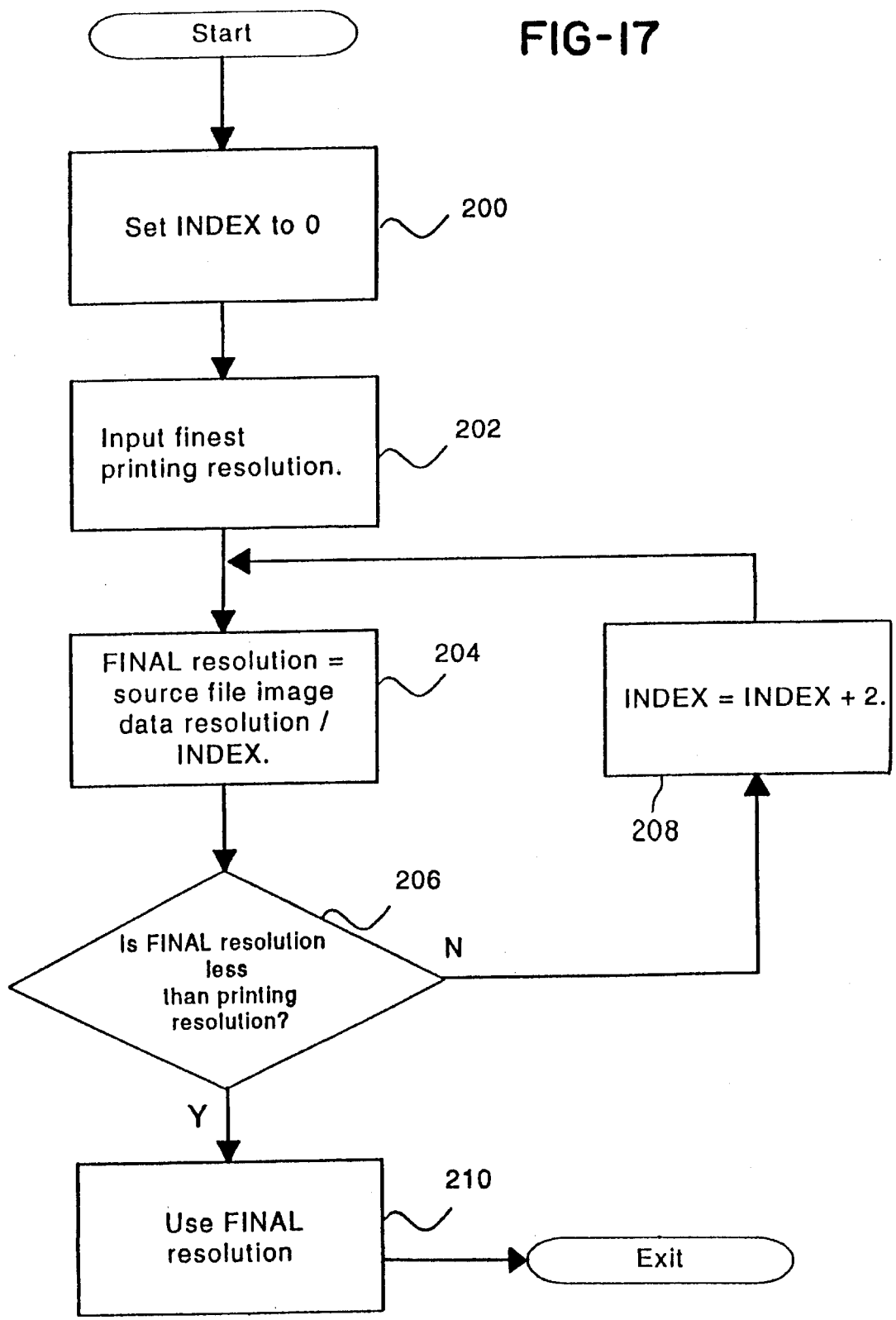
Figure 18:
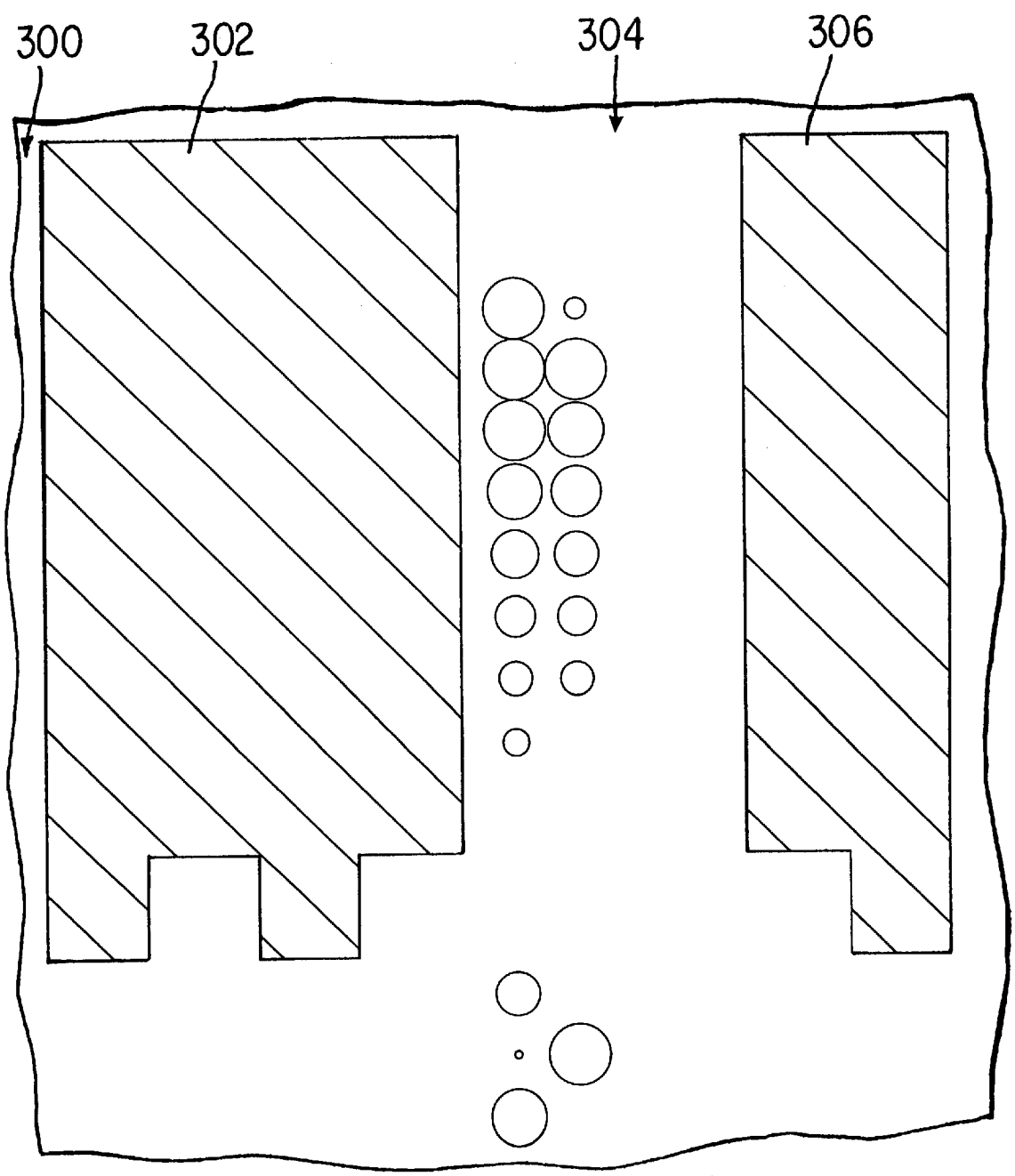
Figure 19:
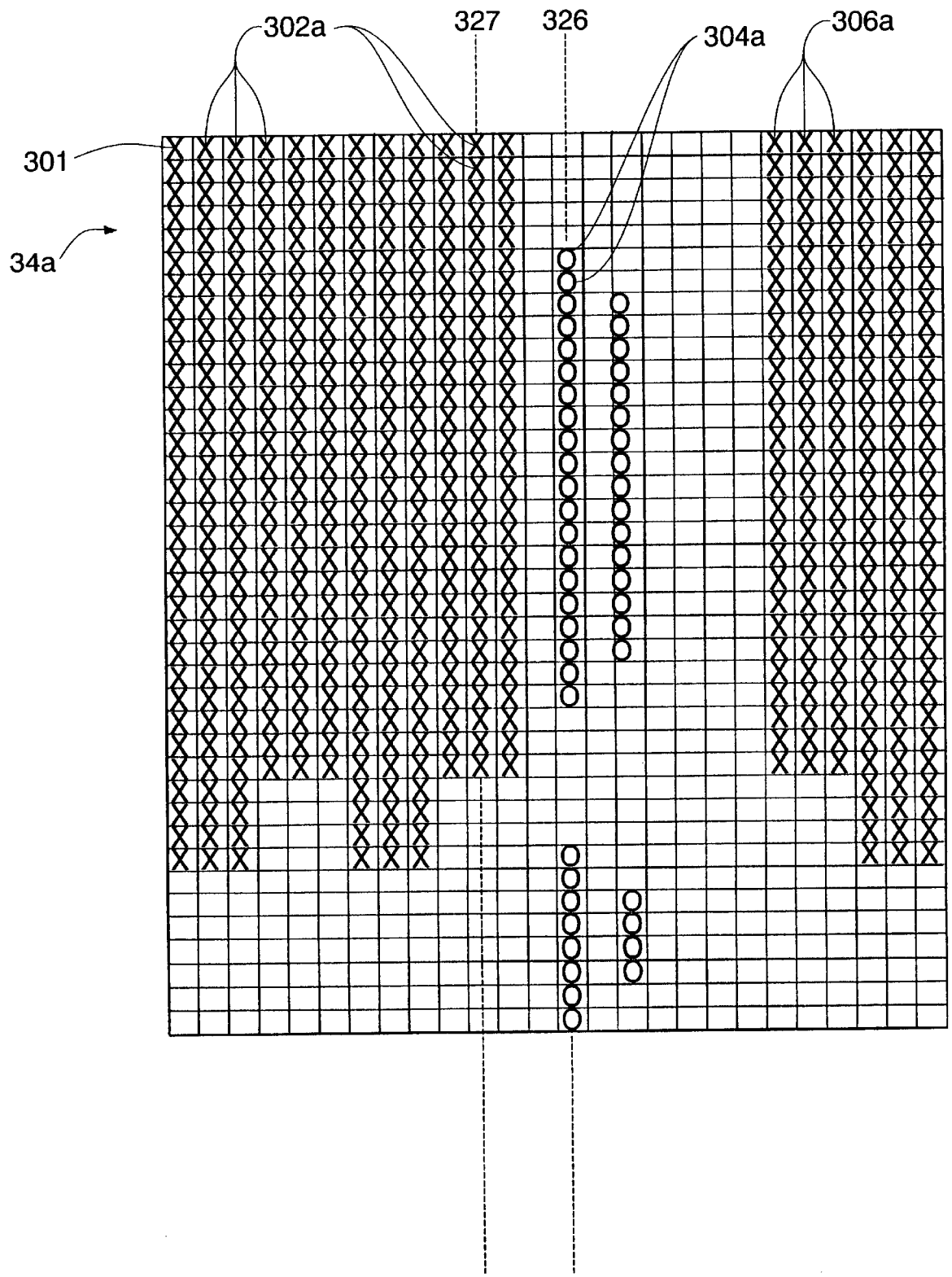
Figure 20:
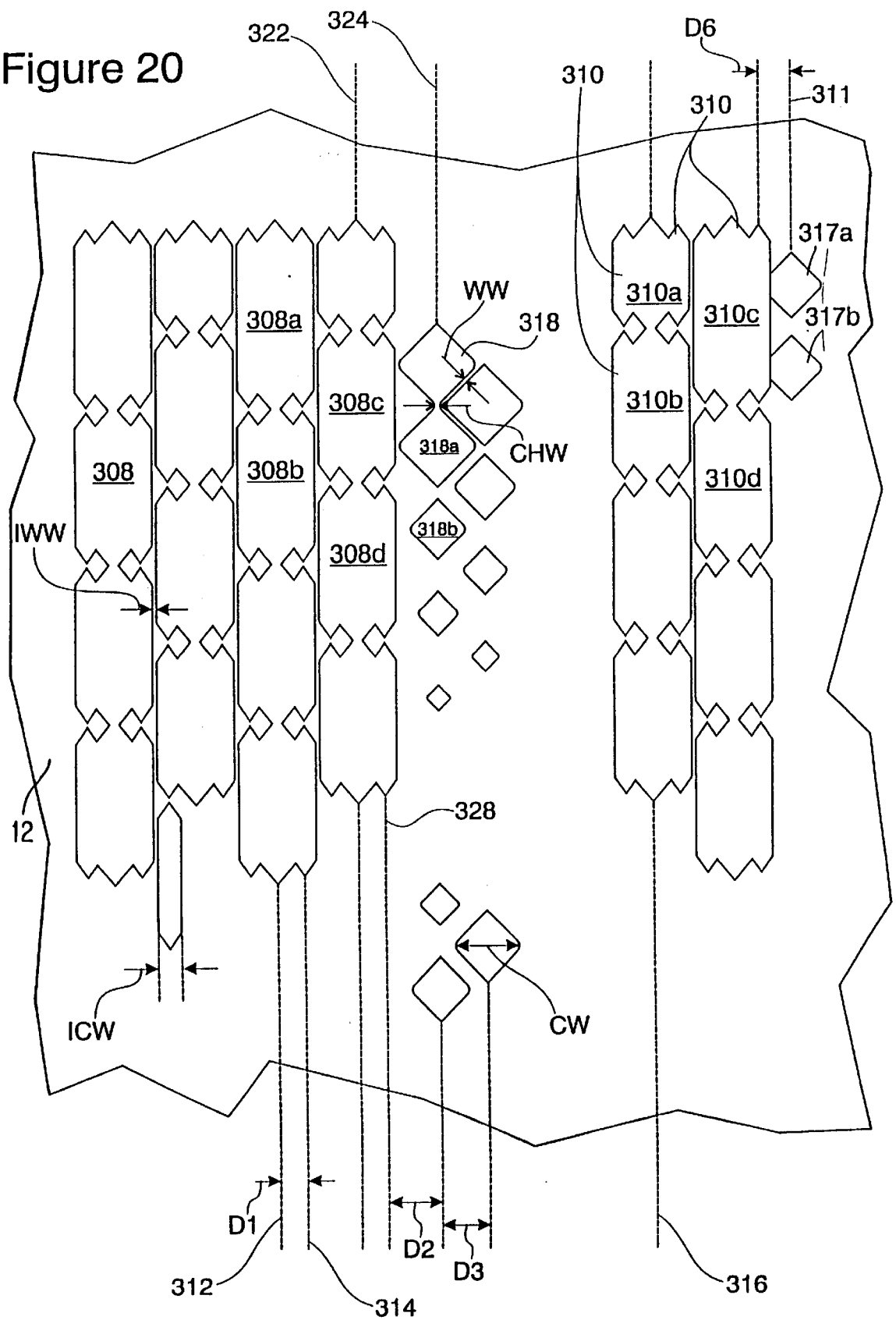
Figure 21:
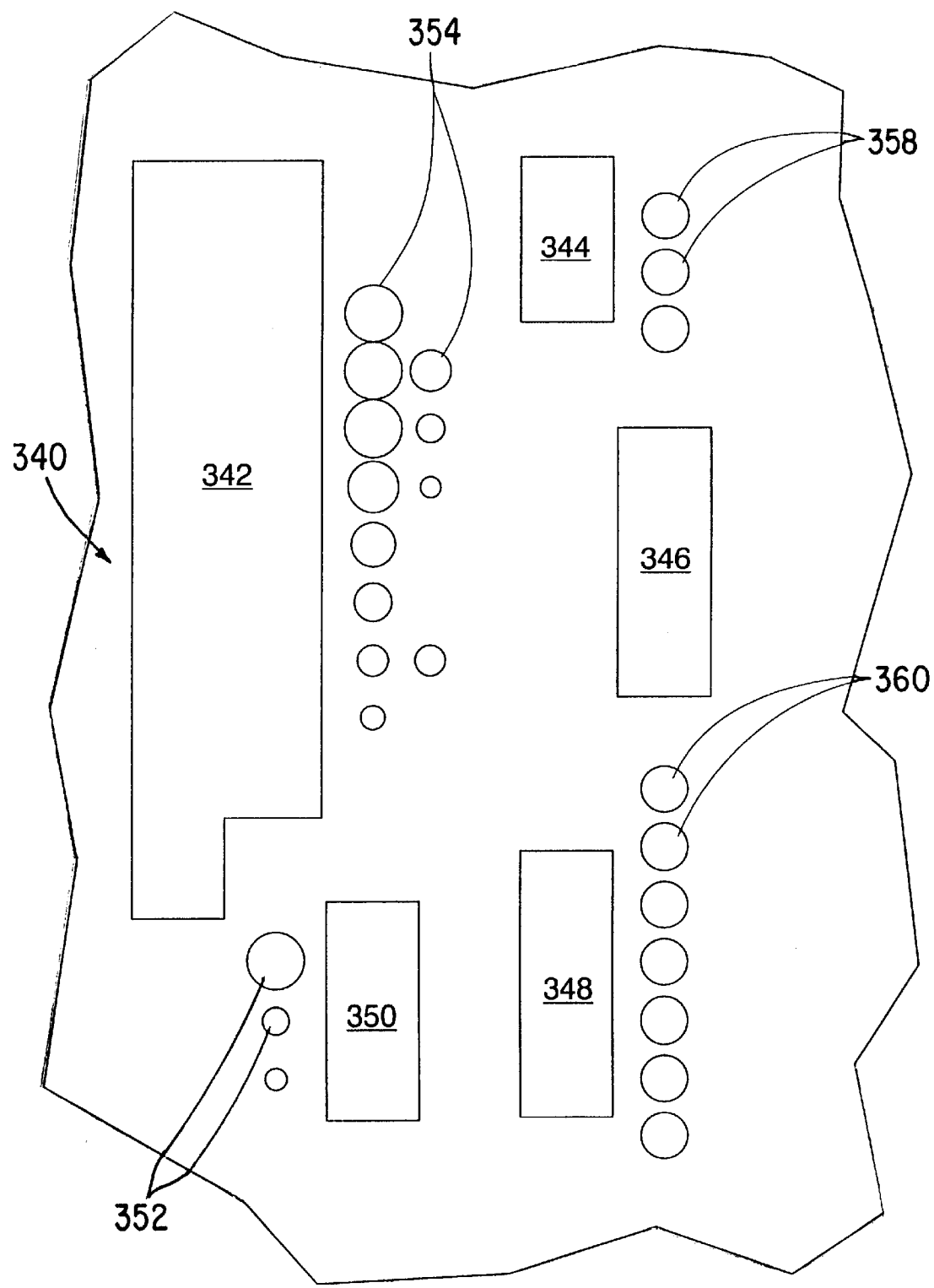
Figure 22:
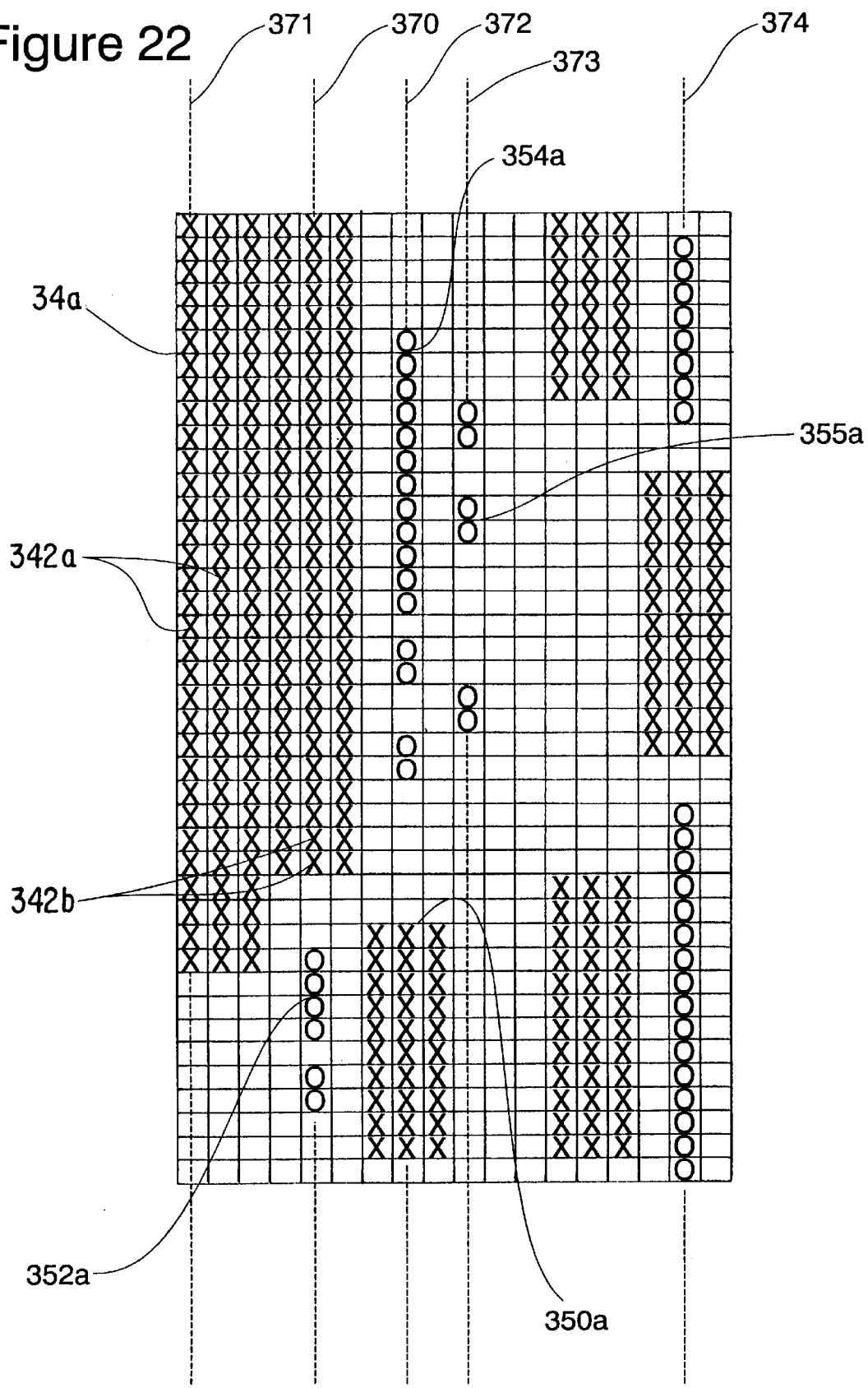
Figure 23:
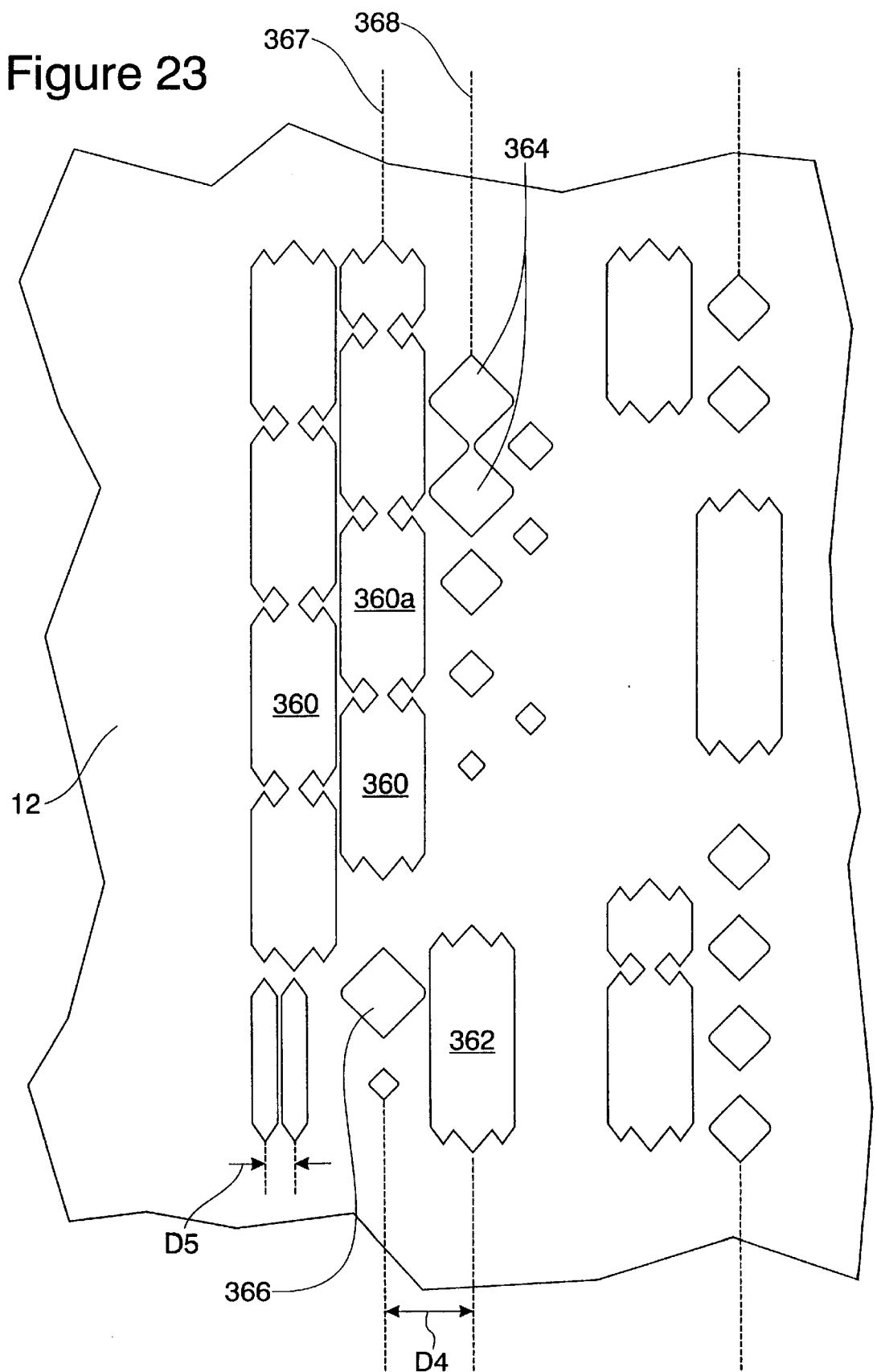
Figure 24:
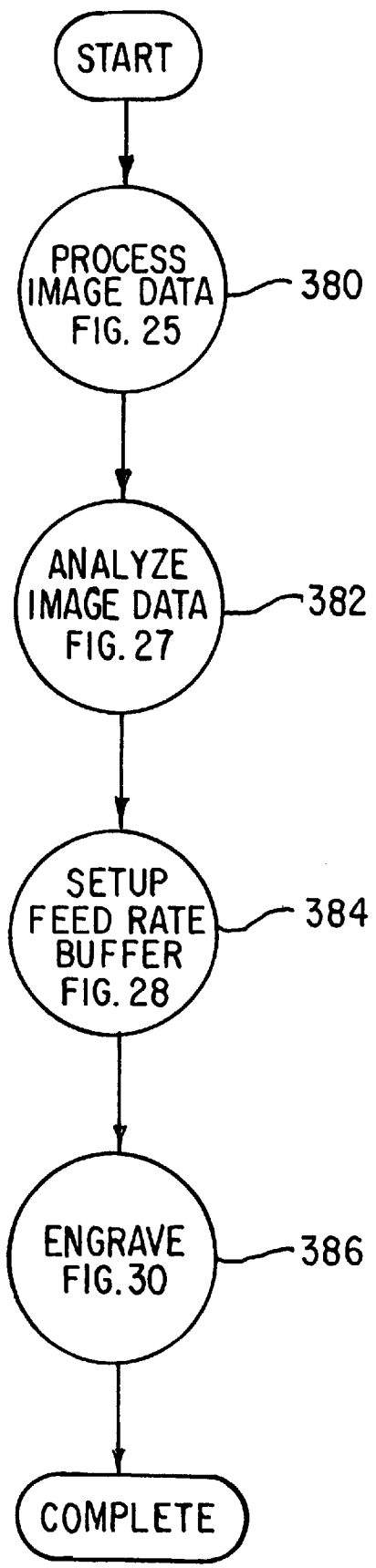
Figure 25:
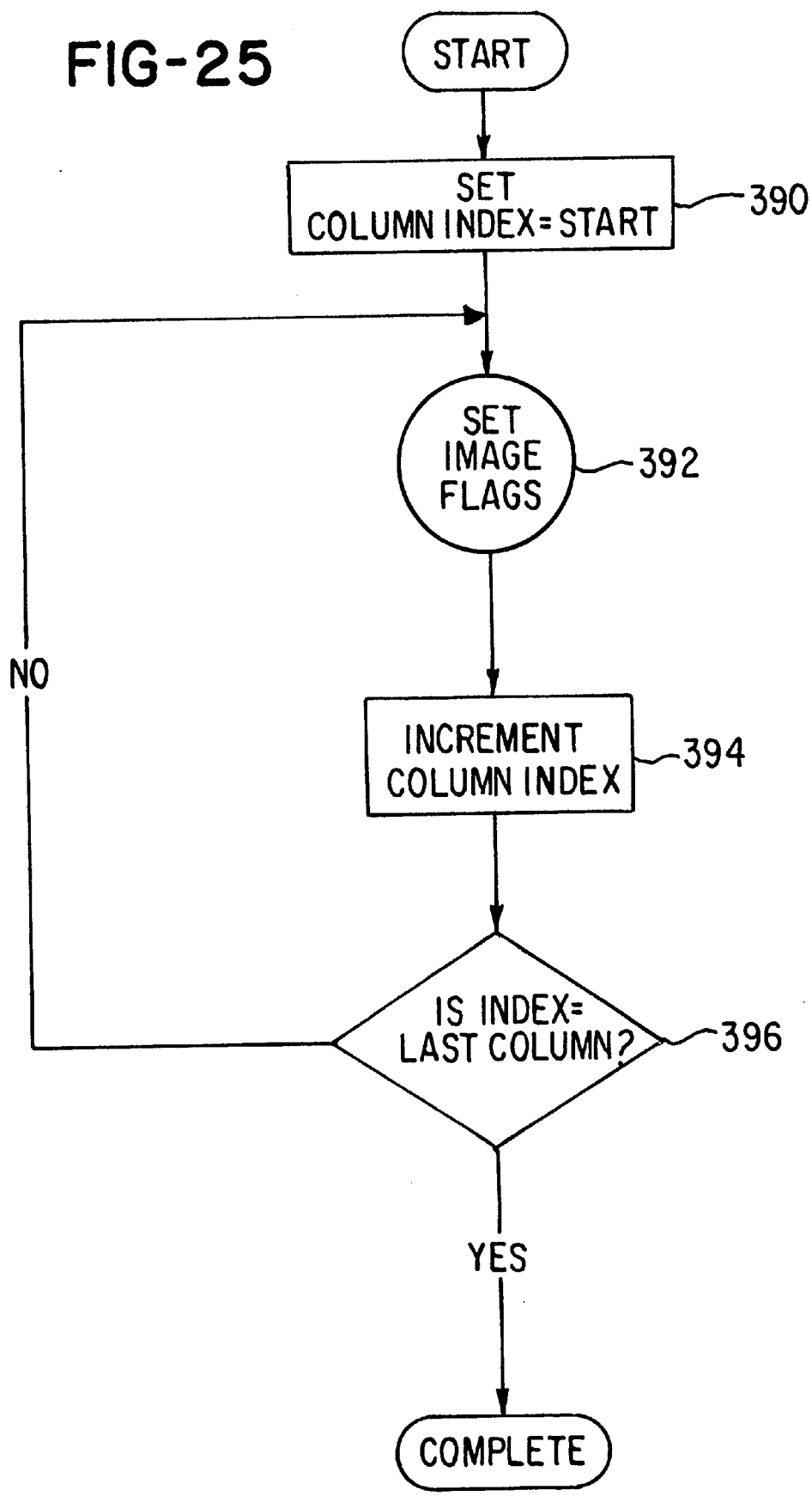
Figure 26:
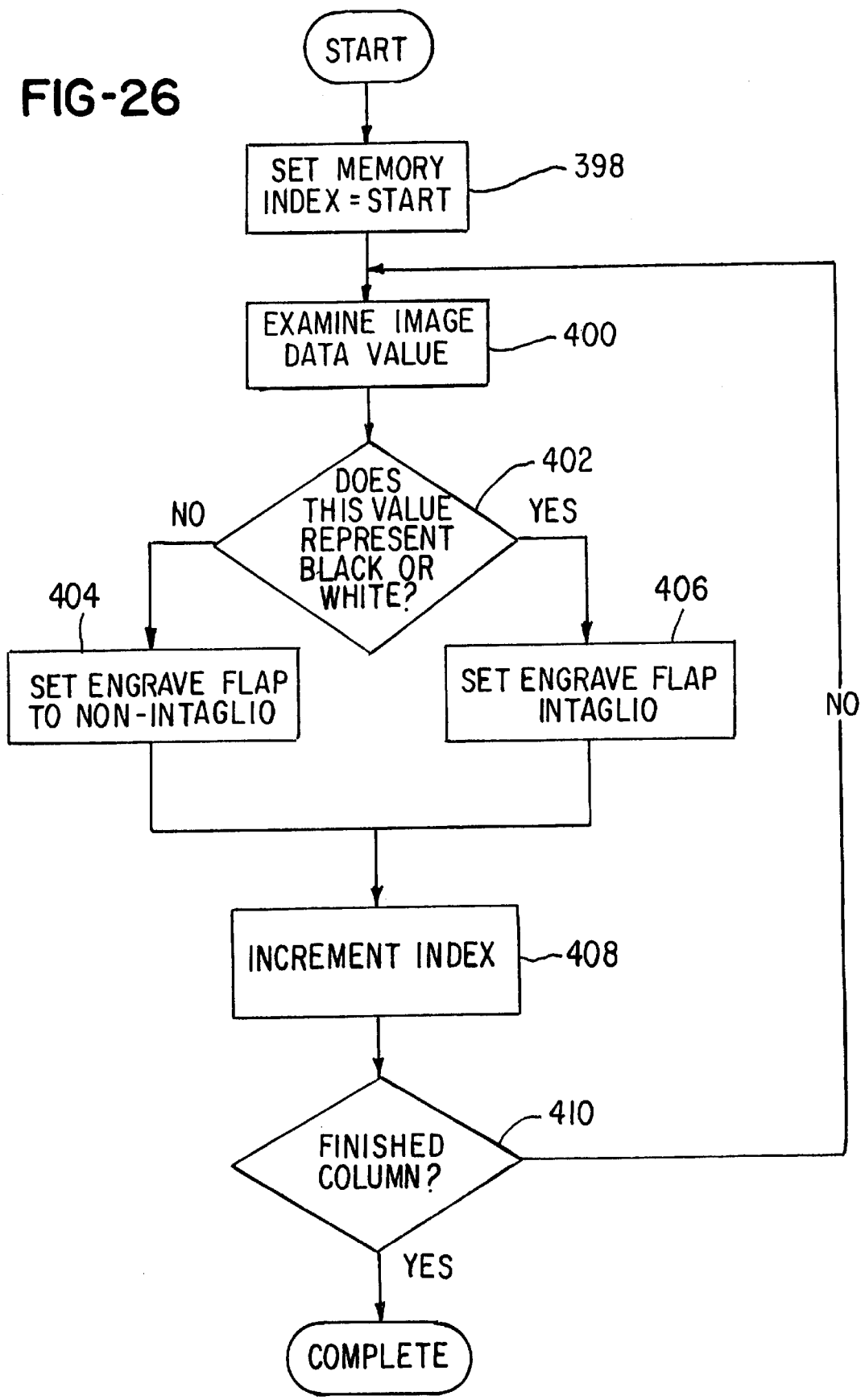

FIG. 5, which is on the same sheet as FIG. 6, is a fragmentary view of a prior art stylus;

FIG. 6A is a plan view of a plurality of prior art cells of the type engraved with the stylus shown in FIG. 5;

FIG. 6B is a fragmentary cross-sectional view taken along the line 6B—6B in FIG. 6A, showing the shape of a typical prior art cell;

FIG. 7, which is on the same sheet as FIG. 3, is a fragmentary view showing a bull nosed stylus according to one embodiment of this invention;

FIG. 8A is a fragmentary plan view showing a plurality of intaglio trenches;

FIG. 8B is a fragmentary cross-sectional view of one of the intaglio trenches shown in FIG. 8A showing the steep angles into and out of the intaglio trench and an associated rise time $T_2$;

FIG. 8C is a picture of a portion of an engraved pattern showing a plurality of engraved intaglio trenches;

FIG. 8D is a picture of a pattern of gravure-engraved cells of the same pattern depicted in FIG. 8C;

FIG. 9A is a fragmentary view of the letters L and A which were engraved on a cylinder using multiple engraving passes as the cylinder rotated in the direction of arrow 81;

FIG. 9B is a fragmentary sectional view taken along the line 9B—9B in FIG. 9A, showing details of the intaglio trenches forming the letter L;

FIG. 9C is a fragmentary sectional view taken along the line 9C—9C in FIG. 9A, showing details of the intaglio trenches which form a portion of the letter A;

FIG. 10A is a fragmentary sectional view of a portion of the cylinder engraved in accordance with a corresponding intaglio engraving signal;

FIG. 10B is a fragmentary plan view of a pair of generally rectangular intaglio-engraved images corresponding to the intaglio engraving signal shown in FIG. 10A;

FIG. 11 is a general schematic diagram showing a method according to an embodiment of this invention;

FIG. 12 is a general schematic diagram showing a fine line boost or signal boost routine;

FIGS. 13A–13B, taken together, is a general schematic diagram showing a ink flow controller routine according to one embodiment of the invention;

FIG. 14A is a plan view showing a drawing of a portion of an intaglio engraving showing a plurality of ink flow controllers or posts positioned in an engraved intaglio trench;

FIG. 14B is a fragmentary showing a plurality of columns of intaglio trenches which were engraved as the cylinder rotated in the direction of arrow 107 and also showing a plurality of staggered ink flow controllers selectively positioned in some of the columns;

FIG. 14C is a cross-sectional view taken along the line 14C—14C in FIG. 14B;

FIG. 15A is an image of a source character "O" for purposes of illustration;

FIG. 15B is an image of data file corresponding to the character shown in FIG. 15A and illustrating a height H which may be analyzed by the fine line boost routine;

FIG. 15C is a fragmentary view of the source image of FIG. 15A after it was engraved on a cylinder with a plurality of generally elongated and connected intaglio trenches;

FIG. 16A is a fragmentary plan view of a plurality of intaglio trenches engraved without using the fine line boost routine in FIG. 12;

FIG. 16B is a fragmentary plan view of the same intaglio image engraved in FIG. 16A showing a plurality of intaglio trenches engraved after using the fine line boost routine of FIG. 12;

FIG. 17 is a general schematic showing an interpolation routine in accordance with one embodiment of this invention;

FIG. 18 is a fragmentary view of a picture which will be engraved in accordance with an embodiment of the invention;

FIG. 19 is a representation of a computer memory in a computer showing a digital representation of the image shown in FIG. 18;

FIG. 20 is a fragmentary view of a cylinder illustrating the intaglio and non-intaglio engraved areas corresponding to the image data shown in FIG. 19;

FIG. 21 is a fragmentary view of another image comprising both intaglio and non-intaglio images;

FIG. 22 is a representation of a computer memory in a computer showing a digital representation of the image shown in FIG. 21;

FIG. 23 is a fragmentary view of a cylinder illustrating the intaglio and non-intaglio engraved areas corresponding to the image data shown in FIG. 22;

FIG. 24 is a schematic diagram of a general process or routine in accordance with an embodiment of the invention;

FIG. 25 is a schematic of a process or routine for processing image data;

FIG. 26 is a schematic diagram of a process or routine for setting image flags;

FIG. 27 is a schematic diagram of a process or routine for analyzing the image data;

FIG. 28 is a schematic diagram illustrating a process or routine for setting up a feed rate buffer;

FIG. 29 is a schematic diagram of a process or routine for scanning each column of data; and FIGS. 30 and 31 are schematic diagrams illustrating a process or routine for engraving in accordance with an embodiment of this invention.

DETAILED DESCRIPTION OF THE PREFERRED EMBODIMENTS

Figure 1:
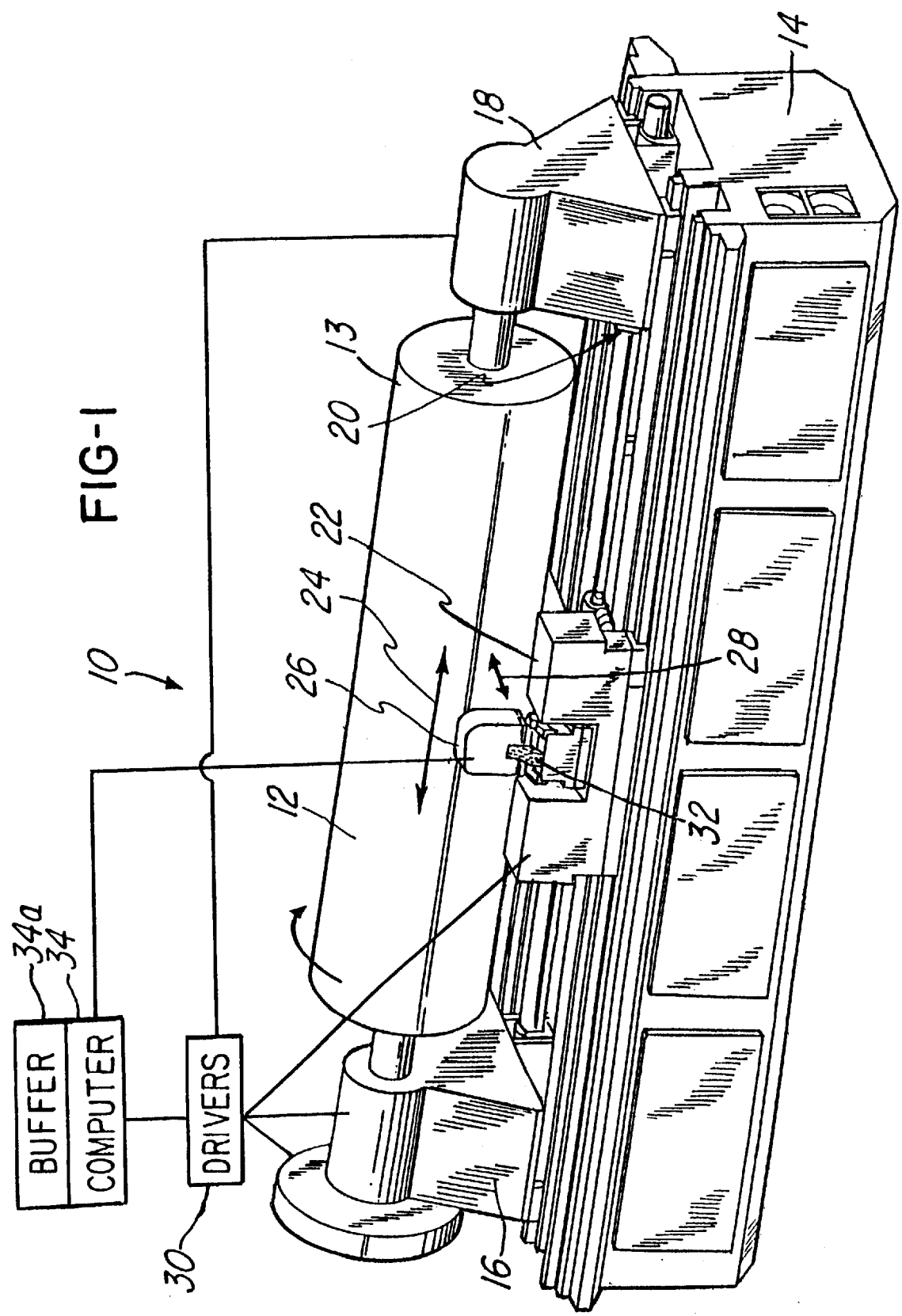
FIG. 1 is a general perspective view of an intaglio engraver having an engraving head according to an embodiment of this invention.

FIG. 1 is a general perspective view of an engraver, designated generally as engraver 10. The engraver 10 is an intaglio engraver for engraving a cylinder 12 which will subsequently be used to print a predetermined intaglio pattern as described below. The cylinder 12 has a surface 13 which has an engravable coating, such as copper, similar to the type used in gravure engraving.

The engraver 10 comprises a base 14 having a headstock 16 and tailstock 18 slidably mounted on a bed 20 situated on the base 14. The headstock 16 and tailstock 18 are slidably and adjustably mounted on the bed 20 with suitable bearings and drive train (not shown) such that the headstock 16 and tailstock 18 can rotatably support the cylinder 12 therebetween. The engraver 10 also comprises a carriage 22 which is also slidably mounted on the bed 20 with suitable bearings and drive train (not shown). The carriage 22 may be driven in the direction of double arrow 24 in order to effect engraving as described below. Notice also that the engraver 10 comprises an engraving head 26 which is slidably mounted on carriage 22 such that it can be driven towards and away from the cylinder 12 in the direction of double arrow 28 in FIG. 1.

The engraver 10 also comprises a plurality of actuators, drive means or drivers 30 which are capable of rotatably driving the cylinder 12. The drivers 30 also comprise suitable motors and drive mechanisms (not shown) for selectively driving carriage 22 and engraving head 26. If desired, the drivers 30 may also comprise at least one suitable drive motor and drive train (not shown) for driving the headstock 16 and tailstock 18 into and out of engagement with the cylinder 12, thereby eliminating the need for manual adjustment. For example, the drivers 30 may cause the headstock 16 and tailstock 18 to be actuated to a fully retracted position (not shown) or to a cylinder support position shown in FIG. 1. The drivers may be selectively energized to cause the headstock 16 and tailstock 18 to be actuated either independently or simultaneously.

Although not shown, a single drive motor may be used with a single lead screw (not shown) having reversed threads (not shown) on which either end causes the headstock 16 and tailstock 18 to move simultaneously towards and away from each other as the lead screw is driven. Driving both the headstock 16 and tailstock 18 permits cylinders 12 of varying lengths to be loaded by an overhead crane, for example, whose path is perpendicular to the axis of rotation of the engraver 10. However, it should be appreciated that a stationary headstock 16 and tailstock 18 may be used with a driven tailstock 16 or headstock 18, respectively, if, for example, a cylinder loading mechanism (not shown) loads the cylinder 12 by moving it in a direction which is generally parallel to the axis of rotation of the engraver.

In addition, the drivers 30 may also drive a lead screw (not shown) which is coupled to the carriage 22 in order to effect driving the carriage 22 in the direction of double arrow 24. Likewise, drivers 30 may also drive a drive train or a leadscrew which causes the engraving head 26 to move on the carriage in the direction of double arrow 28 towards and away from cylinder 12. The engraving head 26, carriage 22 and the driven movement thereof is similar to that shown in U.S. patent application Ser. Nos. 08/038,679; 08/022,127; 08/023,060 and 08/057,327, U.S. Pat. No. 4,450,586 issued to the same assignee as the present application on May 22, 1984; U.S. Pat. No. 4,438,460 issued to the same assignee as the present invention on Mar. 20, 1984; U.S. Pat. No. 4,357,633 issued to the same assignee as the present invention on Nov. 2, 1982; and U.S. Pat. No. 5,329,215 issued to the same assignee as the present invention on Jul. 12, 1994, all of which are incorporated herein by reference and made a part hereof.

The engraver 10 comprises control means, a controller or a computer 34 for controlling the operation of the engraver 10, engraving head 26 and also for generating an intaglio engraving signal 38 (FIG. 10A) corresponding to the selected predetermined intaglio pattern to be engraved. The computer 34 also selectively controls all the drive motors, such as drivers 30 mentioned above, in the engraver 10.

Figure 2:
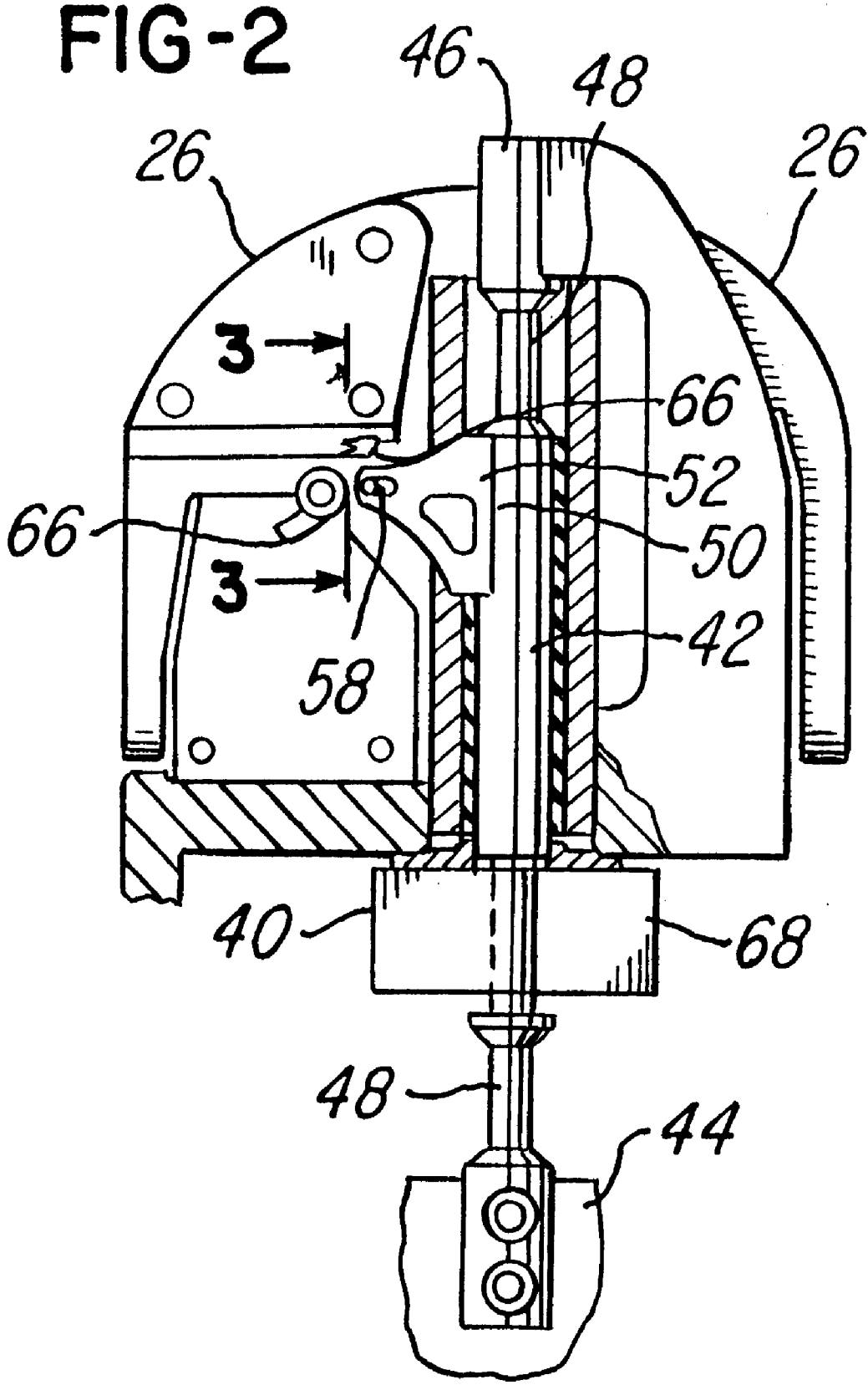
FIG. 2 is a partly broken away sectional view of the engraving head shown in FIG. 1, showing details of an actuator arm, stylus support, and stylus.

As best illustrated in FIG. 2, the engraving head 26 is similar in construction and operation to the gravure engraving heads shown in one or more of the above-referenced patents, and comprises an armature 40 which is rigidly secured to a shaft 42 between opposite end portions 44 and 46 by torsional spring portions 48 of reduced diameter. In the embodiment being described, the shaft 42 has a diameter of about 0.625 inch, and the torsional spring portions each have a diameter of about 0.060 inch. It should be appreciated that the torsional spring portions 48 and shaft portion 42 comprise a thickness diameter and weight which are selected to provide a predetermined rise time of less than approximately 100 microns. In the embodiment being described, the predetermined response time for the engraver 10 for engraving the intaglio pattern is on the order of about 75 to 200 microseconds.

Figure 4:
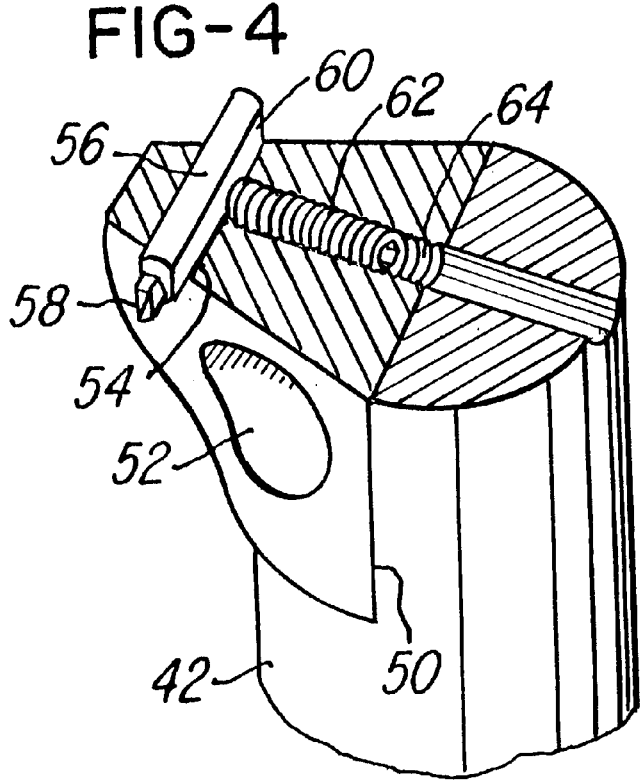
FIG. 4 is a fragmentary view showing details of the stylus arm and stylus.

A notch 50 is formed within the shaft portion 42 and supports an actuator arm 52 which is rigidly secured to the shaft portion 40 by a set of screws (not shown). A cylindrical transverse hole 54 (FIG. 4) is formed within the actuator arm 52, and an elongated rod-like holder 56 is disposed within the hole 54. A cutting stylus 58, preferably formed of diamond, is integrally formed or cemented into one end of the holder 56 which has a flat surface 60. The surface 60 is engaged by a set screw 62 which is threaded into a hole 64 extending outwardly from the shaft 42 through the actuator arm 52 and intersecting the hole 54.

The actuator arm 52 is rigidly secured to the shaft 42 and projects outwardly between a pair of opposing electromagnets (not shown) which are mounted within the base portion of the engraving head 26. When the magnets (not shown) are energized the actuator arm 52 oscillates through an arc of approximately 0.25 degrees.

As shown in FIG. 2, guide shoe 66 is preferably formed of diamond and has a surface 68 (FIG. 3) which engages the surface of the cylinder 12 to be engraved. The construction and operation of the guide shoe 66 is similar to that shown in one or more of the above-referenced patents.

Notice that little or no dampening material has been situated around the shaft 42 (FIG. 2), end portions 44 and 46 and torsional spring portions 48, unlike engraving heads of the past. This facilitates reducing the response time of the engraving head 26.

As best illustrated in FIG. 7, the holder 56 in the embodiment being described has a stylus 58 which is integrally formed or secured thereto and which is generally U-shaped or bull-nosed shaped as shown. The stylus 58 comprises a relief angle $\Theta_1$ in FIG. 7 of more than 5 degrees in one embodiment and may vary between 0 and 60 degrees, if desired. It has been found that an angle $\Theta_1$ of about 20 degrees is suitable.

Notice that stylus 58 comprises a roof angle $\Theta_2$ (FIG. 7) on the order of about 60 degrees. Notice also that the tip of the stylus 58 defines a linear engaging edge or surface 58a for engaging the cylinder 12. In the embodiment being described, the width W is about 20 microns. It should be appreciated, however, that while this embodiment of the invention has been shown with a stylus having the profile and shape shown in FIG. 7, other suitable shapes may be selected depending on the cross-sectional shape of the intaglio trench to be engraved.

The engraving head 26 is slidably located on carriage 22 and is coupled to drivers 30 and computer 34. In a manner similar to engraving heads used in gravure engravers of the past, the engraving head 26 is caused to be positioned in operative relationship with cylinder 12. At the appropriate time and in a manner described below, the computer 34 energizes engraving head 26 to engrave a desired preselected intaglio pattern or portion of an intaglio pattern, such as the picture of a portion of an actual intaglio pattern 70 shown in FIG. 8C. Notice that the intaglio engraving pattern 70 may define a substantially continuous and non-linear intaglio character 73 or a portion of the character shown in FIG. 8C comprises of multiple intaglio trenches or grooves 72. As illustrated in FIG. 8A, notice that a character or portion 77 may be comprised of a plurality of trenches or elongated intaglio trenches 77a. These trenches 77a may be engraved such that they are continuous and connected, or they may be engraved such that one or more engraved areas or trench walls 77b are defined therebetween.

As shown in FIG. 8B, each intaglio trench 77a is engraved to define a groove or channel having a generally planar bottom 79. Notice trench 77a has a very steep forward wall 81 and rear wall 83. The forward wall 81 may be engraved with engraving head 26 having a response time (visually indicated by double arrows $T_2$ in FIG. 8B) on the order of about 100 microseconds in the embodiment being described. Notice that some of the intaglio trenches or channels shown in FIGS. 8A and 8C, like trench 72a, are generally elongated while others, like trench 72b, have a fairly short or narrow height. In the embodiment being described, the engraver 10 is capable of engraving intaglio trenches having a cross-sectional shape as shown in FIG. 8B and having a length X (FIG. 6B) as long as desired or as short as about 1/500 or 0.002 inch for the engraving head 26 when engraving at about 500 dpi.

In contrast, FIG. 8D illustrates another character 89 which was shown engraved using a traditional gravure engraver of the type referred to above. Notice the gravure cells 91 at the top of the character, indicated by arrow 93, that gravure cells are very small and shallow. When these cells are used during actual printing, the printed image will appear non-continuous and as dots, much like the engraved cells appear in FIG. 8D.

Another illustration of an intaglio engraved area or trench according to one embodiment of this invention is shown in FIG. 9A–9C. In this illustration, the intaglio engraving for the letters L and A is shown. Notice that the stylus 58 engraves or "digs" successive trenches, such as channels, grooves or trenches 74, 76, and 78, as the cylinder 12 rotates in the direction of arrow 81 in FIG. 9A. Notice also in the corresponding sectional fragmentary view in FIG. 9B that the trenches 74, 76 and 78 define a generally continuous intaglio trench 83 which defines the intaglio character illustrated in FIG. 9A. For ease of illustration, each successive engraving pass has been identified or separated by the imaginary lines 80 in FIGS. 9A–9C. As mentioned earlier herein, the computer 34 comprises means for generating the intaglio engraving signal corresponding to the predetermined intaglio pattern for the letters "L" and "A". When the signal is used to energize engraving head 26, it will effect engraving of the desired predetermined intaglio pattern 70 shown in FIG. 8. Generation of the intaglio engraving signal is described later herein.

FIGS. 10A and 10B show a partially broken-away cross-sectional illustration of two generally rectangular intaglio characters or portions of characters 86 and 88 formed from a plurality of channels or trenches engraved by the engraving head 26 in response to an intaglio engraving signal 38 as cylinder 12 rotates in the direction of arrow 82. This waveform signal is a pulse-width modulated signal representing or generally corresponding to the intaglio image data after modification as described herein. FIG. 10B is a corresponding fragmentary top view showing the trenches 86 and 88 engraved during multiple passes using signal 38 (FIG. 10A) during the rotation of the cylinder 12. Notice, again, the short rise or response time represented by the double arrow $T_2$ in FIG. 10B. In the embodiment being described, the engraving response time $T_2$ is on the order of about 200 microseconds or about between 75 to 300 microseconds.

Referring now to FIG. 11, a process or method by which computer 34 generates an intaglio engraving signal suitable for engraving an intaglio pattern is shown schematically. First, the computer 34 obtains source file image data or a set of data (block 90) for a character to be engraved. Computer 34 obtains this data from memory or it is inputted by a user via a work station or other input device (not shown). For example, data representing the character "O" in FIG. 15A would be generated or obtained by computer 34.

A printing resolution routine (FIG. 17) described below is then performed at block 92. In this regard, the source file image data is analyzed to determine the resolution which engraver 10 will engrave the intaglio pattern.

The source file image data is typically supplied by computer 34 at a resolution which is greater than the engraving resolution capability of engraver 10. The source file image data is provided at this higher resolution in order to assure maximum image detail corresponding to the source image. For example, the source image shown in FIG. 15A may be provided by computer 34 at 2000 dots per inch ("dpi"), while the engraver 10 has an engraving resolution capability of about 500 dpi in the embodiment being described. Consequently, it is necessary to modify the source file image data to a resolution that is achievable by the engraver 10 while maintaining maximum contrast in the modified source image.

Once the engraving resolution is determined, it may be desirable to boost some or all of the source file image data to a minimum desired or predetermined length. For example, as illustrated in FIG. 15B, the letter "O" has an associated minimum desired engraving height H as indicated. In the embodiment being described, if the height H is less than a predetermined length, then it may be desirable to boost or enhance the source file image data corresponding to that data height H to the appropriate height which will allow the predetermined engraving resolution to be obtained. Thus, for example, in the embodiment being described, the engraver 10 has a predetermined engraving resolution of about 500 dpi. Consequently, if a portion of the intaglio pattern comprises a height H which will not allow 500 dpi to be obtained, then it may be desirable to boost that portion of the source file image data in accordance with a source file boost routine (block 94 in FIG. 11). The source file boost routine is described later herein.

At block 98, the boosted or non-boosted source file image data is interpolated to an engraving resolution using a conventional bi-linear interpolation or image recrypting. One suitable approach for such interpolation is described at Section 14.5, *Digital Image Processing*, 2nd. Ed., authored by William K. Pratt and published by John Wiley & Sons, Inc., 1991.

Next, the modified engraving source image data is further modified or thresholded in order to adjust the contrast in the intaglio engraving pattern (block 100) in accordance with a predetermined threshold. In the embodiment being described, the predetermined threshold requires that those data points or pixels that represent a density of less than 50 percent of black are set to zero or white and those pixels having an associated density of more than 50 percent of black are set to black. It should be appreciated that other threshold values could be used.

After the preliminary engraving source file data is modified or thresholded to adjust for contrast, it is determined (decision block 102) whether to situate one or more ink flow controllers, such as ink flow controllers 144 in FIG. 14A, in the intaglio pattern to be engraved on cylinder 12. In this regard, it has been found that having one or more ink flow controllers situated in the area of the predetermined intaglio pattern facilitates controlling the flow of ink during the printing process. This facilitates reducing or eliminating undesirable ink flow or capillary attraction problems when the intaglio pattern is printed. In addition, the ink flow controllers also facilitate providing support for a doctor blade (not shown) in a printing press (not shown).

FIG. 14A shows a picture of a portion of an intaglio pattern 142 having a plurality of ink flow controllers 144 situated therein. FIG. 14B also illustrates a plurality of ink flow controllers 145 and 147 which were caused to be situated in trenches 149 and 151, respectively. Notice that a trench 153 adjacent trench 149 does not have any ink flow controllers situated therein. Notice also that the ink flow controller routine causes the ink flow controllers, such as ink flow controllers 144 (FIG. 14A) and 145 and 147 (FIG. 14B), to be staggered. This causes an ink flow controller, such as flow controller 145 in FIG. 14B to be positioned between two engraved columns or trenches like trenches 151 and 153.

At the completion of the ink flow controller routine (block 104 in FIG. 11) or if the decision at decision block 102 is negative, then the computer 34 generates (block 106 in FIG. 11) a final intaglio engraving signal corresponding to the preliminary engraving source file data after it has been boosted, thresholded and adjusted.

The computer 34 then energizes engraving head 26 (block 108) of engraver 10 to engrave the predetermined intaglio pattern, such as the engraved "O" 191 in FIG. 15C, in response to the final intaglio engraving signal at block 108 and exits when finished.

In order to facilitate determining the actual intaglio engraving resolution at which the engraver 10 will engrave the intaglio pattern, the resolution routine is used. The resolution routine is in accordance with one embodiment of this invention is shown schematically in FIG. 17. First, computer 34 sets an INDEX to 0 at block 200. At block 202, computer 34 inputs a finest resolution associated with the engraver 10. The finest resolution corresponds to the minimum black pixel run length (described below) which is to be engraved. This length depends, in turn, on such factors as inks, engraving head 26 response characteristics, printing conditions, substrates and the like. In the embodiment being described, the print resolution is on the order of about 500 dpi. Next, at block 204 a FINAL resolution is set equal to the source file image data resolution divided by the INDEX. At decision block 206, it is determined whether the FINAL resolution is less than the printing resolution determined previously at block 202. If it is not, then the INDEX is incremented by a predetermined number, such as two (block 208). The routine then loops back to block 204 as shown.

If the decision at block 206 is yes, then the FINAL resolution is less than the printing resolution at which time computer 34 uses the FINAL resolution. The routine then EXITS back to block 94 (FIG. 11).

Regarding the source file boost routine (block 94 in FIG. 11), FIG. 16A illustrates a predetermined intaglio pattern that was engraved without utilizing the source file boost routine, and FIG. 16B illustrates the same engraved pattern after utilizing the source file boost routine. Notice in FIG. 16A that the stylus 58 did not get to a complete black depth because the height Y was shorter than the resolution (⅟₅₀₀ inch) of the engraving head 10 in the illustration being described. Consequently, due to the high resolution of the pattern being engraved and the associated small response time required to engrave that pattern, the engraver 10 was only capable of oscillating the stylus to a 50% black depth, indicated by dashed line 59. Stated another way, the resolution of the intaglio pattern being engraved may be finer than the response capability of the engraver. Consequently, the engraver 10 will not be capable of getting "in" and "out" of the surface 13 of the cylinder 12 quick enough to engrave fine lines or areas of the intaglio pattern. As stated above, the engraver 10 will only be capable of engraving to about 50% of a full black depth. This, in turn, causes the intaglio trenches 191 to be shallower, thinner and shorter than desired in the illustration being described. Therefore, this inhibited the ability of engraver 10 to engrave, for example, continuous intaglio trenches which define fine lines or intaglio patterns.

Thus, in order to ensure that the engraver 10 engraved an intaglio trench of appropriate width, height and depth (such as at a 100% black depth represented by dashed line 61 in FIG. 16B), the source file image data may be boosted. This facilitates ensuring that the source file image data is at a resolution which is equal to or less than the resolution capability of the engraver.

The source file boost routine in accordance with one embodiment will now be described in relation to FIG. 12. After the source file boost routine is initiated, the source file image data is loaded at block 110 into a buffer. The routine proceeds to block 114 where computer 34 determines the data length associated with data runs of one or more black pixels. Once the data length is obtained by computer 34, it is checked at decision block 116 to determine if it is less than a predetermined length. If it is less than the predetermined length, the routine proceeds to block 118 where the center of the data is calculated.

At block 120, the routine backs up approximately one-half the number of pixels in the predetermined length and then proceeds to modify the source file image data to a minimum black pixel run length. In the embodiment being described, the minimum black pixel run length is dependent on various factors, including engraving head 26 response characteristic, printing conditions, inks, substrates and the like.

After either this procedure or if the decision at decision block 116 is answered in the negative, then the routine proceeds to decision block 124 where it is determined if an entire column of pixels for the intaglio image being analyzed is complete (decision block 124). If not, the routine proceeds back to block 114 as shown.

When the routine is complete, it exits and a modified or non-modified data file (block 126) is stored by computer 34 in suitable memory. Thereafter, the routine exits and proceeds to block 98 in FIG. 11.

Regarding the ink controller routine (block 104 in FIG. 11), FIGS. 14B and 14C shows a cross-sectional view of a plurality of ink flow controllers 147a and 147b which were caused to be situated in the engraved trench 146 to define subtrenches 146a, 146b and 146c. Notice that the ink flow controllers, such as ink flow controller 147b in FIG. 14C, could be of a height which defines a white area when the predetermined intaglio pattern is printed. Alternatively, each ink flow controller could define a post or controller of any suitable height, width or shape which facilitates controlling undesirable turbulence and ink flow when the intaglio pattern is printed. In the embodiment being described, it should be appreciated that the ink flow controllers shown in FIGS. 14A–14C represent one pixel generated by the ink controller routine described below. Although not shown, the program or ink controller routine could generate ink flow controllers 144 (FIG. 14A) having any predetermined size, height or width as desired.

If one or more ink flow controllers 144 are needed, then the computer 34 proceeds to the ink controller routine (block 104 in FIG. 11) which is represented schematically in FIGS. 13A and 13B. Referring to FIG. 13A, computer 34 first sets a vertical offset in pixels as the OFFSET and also sets a toggle to true at block 128. The vertical OFFSET corresponds to the distance between adjacent ink flow controllers. In this illustration, the vertical OFFSET is constant between ink flow controllers. However, it should be appreciated that other algorithms could be utilized to space the ink flow controllers in either a non-symmetrical or symmetrical pattern.

The computer 34 then reads the first and second columns of pixels at block 130, and at block 132, reads a third column of pixels before proceeding to a subroutine A (FIG. 13B). The first, second and third column of pixels correspond to adjacent columns of pixel data corresponding to a portion of the intaglio character to be engraved. For example, in FIG. 14B the first, second and third columns of pixel data may generally corresponds to the engraved areas indicated by adjacent engraved areas 141a, 141b and 141c. As indicated at block 142, if the toggle is true (which it will be through the first pass through the routine), the INDEX is set to one-half of the OFFSET, otherwise, the INDEX is set to zero. The routine then proceeds to decision block 144 where the second column pixel at the INDEX location is checked to determine whether it is white or black. If it is black, then the routine proceeds to decision block 146 where it is determined whether the first column pixel at the same INDEX location is black. If the first column pixel at the INDEX location is white, then the routine proceeds to decision block 148 where it is determined whether the pixel at the INDEX location of the third column is black. If the PIXEL at the INDEX location of the first column is black at block 146, then the routine proceeds to decision block 150 where it is determined if the pixel at the INDEX location of the third column is black. If it is black or if the decision at block 148 is negative, then the second column pixel at the INDEX location is set to white.

If the decision at decision block 148 is yes or if the decision at either decision block 144 or 150 is negative, then the routine proceeds to decision block 154 as shown. It is then determined whether subroutine A is complete at decision block 154, and if not, it proceeds to increment the INDEX by the OFFSET at block 156 and then again proceeds to block 144 as indicated in FIG. 13B. The routine is complete if all the columns of pixel data for that portion of the intaglio image or pattern being checked are processed.

If the decision at block 154 is yes, then the routine proceeds to block 134 (FIG. 13A) where the pixels are written or stored in memory (not shown) of computer 34. If the ink controller routine has processed all columns of data (decision block 136 in FIG. 13A), then the routine exits. The routine will be complete at block 136 (FIG. 13A) if it has gone through all columns of data for a given intaglio image or pattern being engraved, such as the letter "O" in FIG. 15A. If it is not complete, then the routine proceeds to block 138 where the toggle is toggled. The routine then proceeds to block 140 where the second column of pixel data becomes the first column and the third column becomes the second column and a new third column of pixels is read (block 132).

Once either the ink controller routine is exited or if it is determined that no ink controller is needed (decision block 102, FIG. 11), then the final intaglio engraving signal is generated at block 106 as mentioned above. The final intaglio engraving signal is then used by computer 34 to energize engraving head 26 in order to effect the engraving of the predetermined intaglio pattern on cylinder 12. The engraving process and method are then complete.

An illustration of the apparatus and method for engraving the predetermined intaglio pattern on the cylinder 12 for use in a printing press (not shown) for printing the predetermined intaglio pattern will now be described. First, the cylinder 12 is rotatably mounted on engraver 10 between headstock 16 and tailstock 18. Drivers 30 rotatably drive the cylinder and the engraving head carriage 22 in rise to signals received from computer 34. Computer 34 also energizes drivers 30 to cause engraving head 26 to move into a start position so as to begin engraving the predetermined intaglio pattern.

The intaglio engraving signal which generally corresponds to the predetermined intaglio pattern is generated in the manner described above. The computer 34 of engraver 10 then energizes the engraving head 26 to, in turn, cause the actuator arm 52 to oscillate towards and away from cylinder 12 in response to the intaglio engraving signal 38 corresponding to the predetermined intaglio pattern. As the actuator arm 52 and stylus 58 (FIG. 4) engage the surface of the cylinder 12, at least one intaglio trench is created. As mentioned earlier herein, it may be desirable to modify the intaglio engraving signal such that at least one ink flow controller or post 144 is provided in the intaglio pattern when it is engraved in which case the ink controller routine is initiated (blocks 102 and 104 in FIG. 11). It may also be desirable as indicated above to boost a portion or all of the source file image data.

As mentioned above, the source file image data (illustrated in FIG. 15B) is stored in memory in computer 34, or inputted into computer 34, for example, by an independent input terminal or work station (not shown). The source file image data is analyzed as described earlier herein and an engraving resolution is determined (block 90 in FIG. 11). The source file image data is again modified or thresholded as described above and a preliminary intaglio engraving signal is generated (block 94 in FIG. 11). An intaglio pattern, such as the engraved "O" in FIG. 15C may then be engraved in response to the intaglio engraving signal.

After the cylinder 12 has been rotatably mounted in engraver 10, the intaglio process may begin. One or more predetermined intaglio patterns or grooves of such patterns which include one or more intaglio characters are then engraved on the surface 13 of cylinder 12. When engraving is complete, the cylinder 12 may be removed from the engraver 10.

The cylinder 12 may then be rotatably mounted in a printing press (not shown). A web of material, such as paper, plastic or the like, may then be fed through the printing press and the predetermined patterns may be printed on the web.

Advantageously, this method and apparatus facilitates engraving predetermined intaglio patterns having continuous grooves or trenches on cylinders, while the cylinders are rotated. It should be appreciated that this intaglio engraving could be utilized with cylindrical type engravers or helical type engravers, for example, of the type that were traditionally used in gravure engraving. Also, the features of this invention may be used with other types of engraving such as laser engraving.

Further, this apparatus and method facilitate engraving or even embossing intaglio patterns or images on a cylinder which can be engraved at speeds comparable or better than conventional gravure engravers. Also, the intaglio engraving can be performed much quicker than, for example, manual engraving of plates. Intaglio engraving in accordance with this method and apparatus is also more accurate when compared to engraving systems and methods of the past.

Finally, this invention facilitates using a substantially or completely continuous square engraving signal which was not heretofore used in engravers which engraved intaglio patterns on cylinders for use in printing presses.

Referring now to FIGS. 18–31, a system and method for engraving a mixture of intaglio and non-intaglio patterns in accordance with another embodiment of the invention will now be described.

As a general overview, FIGS. 18–20 and 21–23 illustrate two examples of mixtures of intaglio and non-intaglio engraved areas. FIG. 18 is a fragmentary view of a picture or image 300 which is designed to be engraved. The picture or image 300 comprises a first area 302, a second area 304 and a third area 306. The first and third areas 302 and 306 identify areas in the picture 300 that are either black or white (i.e., comprises a density of either 100% or 0%, respectively). The second area 304 identifies areas in the picture 300 which are considered "gray" or which comprise a density which is greater than zero percent but less than one hundred percent.

The image data associated with the image 300 shown in FIG. 18 is digitized, scanned or otherwise input into suitable memory of computer 34, with such memory being pictorially represented as the memory or grid 34a in FIG. 19.

Notice that for each area, such as areas 302 and 306 (FIG. 18), there is associated image data items 302a and 306a, respectively, stored in memory 34a. For ease of illustration, any data in memory 34a corresponding to non-intaglio areas 304 (FIG. 13) is identified with an "O", while data corresponding to intaglio areas 302 and 306 is identified with an "X".

It should be appreciated that each entry in the memory 34a of computer 34 comprises a first component or header (not shown) which will define a flag or tag for identifying the image data as either a non-intaglio data value which corresponds to a non-intaglio area, like area 304 in FIG. 18, or an intaglio data value corresponding to an intaglio area, like areas 302 and 306 in FIG. 18. The remaining component of each data value entry comprises the density value corresponding to that portion of the picture (such as picture 300 in FIG. 18) to which the data value relates.

FIG. 20 illustrates a plurality of intaglio engraved areas 308 and 310. Notice that areas 308a and 308b, for example, lie in a first column 312, while 308c and 308d lie in a second column 322. Notice also that intaglio engraved areas 310a and 310b lie in a third column 316.

For ease of illustration, it should be appreciated that non-intaglio engraved areas in column 324 in FIG. 20, such as engraved areas 318a and 318b, represent engravings corresponding to non-intaglio data 304a situated in column 326 (FIG. 19). Similarly, intaglio engraved areas, such as areas 308c and 308d from column 322 in FIG. 20 correspond to intaglio data 302a situated in column 327 in FIG. 19.

As will be described later herein, it should be appreciated that a distance between adjacent columns of intaglio engraved areas, such as distance D1 (FIG. 20) between columns 312 and 314, generally corresponds or correlates to a first predetermined feed rate at which the computer 34 energizes drivers 30 (FIG. 1) to drive engraving head 26 in order to effect engraving the intaglio engraved areas. Likewise, distance D2 corresponds to a second predetermined feed rate between intaglio and non-intaglio areas and D3 corresponds to a third predetermined feed rate between non-intaglio engraved areas.

As is conventionally known, the third predetermined feed rate associated with distance D3 (FIG. 20) may be determined using the following formula:

$$FR_1 = [1/2(CW) + 1/2(CHW) + 1/2(WW)] \div 1\ REV$$

Where $FR_1$ is a feed rate (microns/revolution);

CW is the engraved area width (microns) shown in FIG. 20;

"1 REV" corresponds to a single revolution of a cylinder;

CHW is a channel width (microns) as shown in FIG. 20; and

WW is a wall width as shown in FIG. 20.

In contrast, the intaglio feed rate associated with distances $D_1$ may be calculated using the formula:

$$FR_2 = [1(ICW) + (IWW)] \div 1\ REV$$

WHERE $FR_2$ is a feed rate (microns/revolution);

ICW is an engraved area width (microns) as shown in FIG. 20; and

IWW is a wall width (microns) as shown in FIG. 20.

In the embodiment being described, the intaglio feed rate is typically greater than 5 microns per revolution.

It should be appreciated that in the embodiment being described, the feed rate for the distance D2 may be arbitrarily determined depending on the engraving characteristics desired. For example, as illustrated in FIG. 20, a column 311 comprising non-intaglio areas 317a and 317b may be engraved at a shorter feed rate which has been determined such that they overlap intaglio areas 310c and 310d. Alternatively, a longer feed rate could be utilized to space the intaglio and non-intaglio areas a greater distance apart.

Similarly, the distance D2 between columns 324 and 328 of non-intaglio engraved areas 318 corresponds to a second predetermined feed rate at which computer 34 energizes drivers 30 to drive engraving head 26 in order to effect engraving of the non-intaglio engraved areas. It has been found that it may be desirable to vary the first and third predetermined feed rates. For example, it has been found that the predetermined feed rate $FR_1$ be greater than the predetermined feed rate $FR_2$ because the intaglio engraved areas are oftentimes used to create fine detail, such as fine lines and textual figures, whereas non-intaglio engraved areas are used to create tonal images. Consequently, the intaglio engraved areas typically require more and smaller engraved areas, thereby requiring that the feed rate be shorter.

FIG. 21 illustrates another picture or image 340 comprising intaglio areas, such as areas 342, 344, 346, 348 and 350, which comprise either all black or all white areas. The image 340 also comprises non-intaglio areas, such as areas 352, 354, 358 and 360 which are "gray". In this illustration being described, the former areas are tagged or flagged as intaglio areas, while the later areas are tagged or flagged as non-intaglio areas. Similar to the relation between FIG. 19 and FIG. 20, FIG. 22 illustrates a digitized representation in computer memory 34a of the image shown in FIG. 21. Notice that the image data, such as data 342a (FIG. 22), corresponds to the area 342 in FIG. 21. Likewise, image data 354a in memory 34a is a digitized representation of area 354 in FIG. 21. Notice that the areas shown in FIG. 21 and their respective image data shown in FIG. 22 are mixed or comingled in a vertical direction (as viewed in FIGS. 21 and 22). Thus, image data representing non-intaglio or gray areas, such as data 354a in FIG. 21, is mixed with columns of data associated with non-gray areas 350.

Computer 34 utilizes the digitized image data illustrated in FIG. 22 in computer memory 34a, such as data 342a, 350a and 354a in FIG. 22, to engrave the areas 360, 362 and 364, respectively. In the illustration, notice that column 367 (FIG. 23) comprise both intaglio engraved areas, such as area 360a, and non-intaglio engraved areas, such as area 366. Likewise, column 368 comprises non-intaglio engraved areas 364 and intaglio engraved area 362.

It should be appreciated that the distance D4 between columns 367 and 368 generally corresponds or correlates to a multiple of a distance D5 in the illustration being described and has a feed rate which corresponds to the predetermined feed rate $FR_2$ mentioned earlier herein.

It should be appreciated, however, that the distance D4 could be any arbitrary value as may be desired. For example, if a constant feed rate is desired, then D4 will be a multiple of D5. On the other hand, if a non-constant feed rate is desired, then D4 can be determined or varied on a column-by-column basis as desired.

In the illustration being described, it has been found to be desirable that the feed rate for any column of engraved areas generally be determined by whether the column comprises an intaglio engraved area, such as the intaglio engraved area 360a in FIG. 23. If it does, the first predetermined feed rate $FR_2$ mentioned earlier herein is utilized by computer 34 to energize drivers 30 to drive engraving head 26 in order to effect engraving.

As alluded to earlier herein, the feed rate for driving engraving head 26 to engrave the columns of image data, such as columns 370, 372 and 374, may vary depending on whether the columns 370–374 comprise only intaglio data, non-intaglio data or a mixture of non-intaglio and intaglio data (e.g., data 352a and 342b in FIG. 22). In general and in the embodiment being described, any column, such as column 370 in FIG. 22, which includes a mixture of intaglio data and non-intaglio data, as well as any column which includes only intaglio data, such as column 371 in FIG. 22, is engraved using the same predetermined feed rate, such as the first or second predetermined feed rate mentioned earlier herein. However, columns comprising only non-intaglio data, such as column 373 in FIG. 22, the non-intaglio is engraved using the third predetermined feed rate mentioned earlier. The method and system for engraving the images 300 (FIG. 18) and 340 (FIG. 21) while now be described.

FIG. 24 shows an overall methodology for engraving the cylinder 12 with a mixed pattern of intaglio and non-intaglio engraved areas. The process or routine begins at block 380 where the computer 34 (FIG. 1) processes the image data, such as the data 302a and 304a in FIG. 19 and data 342b and 342a in FIG. 22, after the data has been stored in memory 34a of computer 34. The image data associated with the picture or image, such as image 300 in FIG. 18 and image 340 in FIG. 21, respectively, may be input using a conventional scanner (not shown), from a workstation or other computer (not shown), from a memory device or any other suitable input device. The computer 34 utilizes the means or routine illustrated in FIGS. 25 and 26 to process the image data in a manner described later herein.

The routine proceeds to analyze the image data at block 382 utilizing the routine and procedure shown in FIG. 27.

At block 384, the routine or procedure utilizes the analysis performed at block 382 and determines a feed rate utilizing a feed rate buffer 34a (FIG. 1) in computer 34, as described relative to FIGS. 28–29.

At block 386, the routine proceeds by performing the engraving function as described relative to FIGS. 30 and 31.

After the engraving routine is finished, the engraving of cylinder 12 is complete and the cylinder 12 may, thereafter, be placed in a printing press (not shown), where a paper, plastic or other web of material, for example, may be printed.

The processing of the image data (block 380 in FIG. 24) begins at block 390 in FIG. 25 where computer 34 sets a column index to a start position. In general, it should be appreciated that the computer 34 processes data items on a column-by-column basis, with each data item within a column being processed serially.

The routine proceeds to set image flags (block 392 in FIG. 25) in accordance with the procedure shown in FIG. 26, as described later herein. In general, the image flags facilitate identifying the type of image data (i.e., either non-intaglio data or intaglio data) for further processing as described herein. After image flags are set at block 392, the routine proceeds to increment the column index counter at block 394. Thereafter, the routine proceeds to decision block 396 where it is determined if the index count is equal to the last column, thereby indicating that all the image data in memory has been processed. If it has not, the routine loops back to block 392 as shown. Otherwise, the routine terminates.

Referring now to FIG. 26, the procedure or means by which computer 34 sets the image flags will now be described. At block 398 in FIG. 26, computer 34 sets a memory pointer or index to a start position. This position corresponds to a first data item position, such as the position occupied by data item 301 in FIG. 19. At block 400, the routine proceeds where computer 34 examines the image data value located in this position of memory in the buffer 34a (FIG. 1). At decision block 402, computer 34 determines if this value represents a density of either a one hundred percent density or "black" data item or a zero percent density or "white" data item. If it does, then computer 34 assigns an intaglio engrave type flag to the data item associated with the position 301. If the decision at decision block 402 is negative, then the routine proceeds to assign a non-intaglio engrave type flag to the data item (block 404).

The routine continues to block 408 where the memory index is incremented. At decision block 410 it is determined whether each of the data items in the column has been processed. If they have, then the routine is complete and proceeds to block 394 (FIG. 25) as shown. If the decision at decision block 410 is negative, then the routine loops back to block 400 as shown.

After all the image data flags are set for each item of data in a column and each column of data has been processed by computer 34, the routine proceeds to analyze the image data in accordance with FIG. 27 which will now be described.

In general, it should be appreciated that the image data is analyzed to determine whether there is a mixture of intaglio and non-intaglio data within a column beginning with the first column in memory 34a. It should also be appreciated, that computer 34 analyzes the image data after the non-intaglio or intaglio flags mentioned above relative to FIG. 26 have been set.

In the embodiment being described, the routine illustrated in FIG. 27, determines or sets the feed rate at which computer 34 will energize drivers 30 to drive engraving head 26 to the first predetermined feed rate if there is a mixture of intaglio and non-intaglio data within any column of data. If there is not a mixture, then other processing in accordance with FIGS. 28 and 29 will be required to determine whether the data within the column is either non-intaglio data or intaglio data.

Accordingly, the routine begins at block 412 (FIG. 27) by setting the column index counter to a start position, which initially begins with the first column of data. Computer 34 proceeds to block 414 where it sets a default feed rate, for example, to the predetermined feed rate $FR_1$ mentioned earlier herein. The routine continues at block 416 where computer 34 examines the non-intaglio and intaglio flags set at blocks 404 and 406 in FIG. 26 for each data item. If there is a mixture of non-intaglio and intaglio flags and it is determined that the feed rate be constant, then the routine proceeds to block 420 where computer 34 sets the engraving feed rate for all data for the entire cylinder at the predetermined feed rate $FR_2$ mentioned earlier herein. This feed rate is stored in a feed rate buffer described later herein relative to FIG. 28. Thereafter, the routine is complete and proceeds to block 384 (FIG. 24) as shown.

If the decision at decision block 418 is negative, then computer 34 increments the column index (block 422) and proceeds to decision block 424 where it is determined if the column index corresponds to the last column. If it is, then the routine is complete and proceeds to block 384 (FIG. 24). Otherwise, the routine loops back to block 416 as shown.

Thus, it should be appreciated that if there is a mixture of intaglio and non-intaglio data within any column and it is desired that the feed rate be constant, then the feed rate for all data for the entire cylinder is set to the feed rate $FR_2$ mentioned earlier herein. If there is not a mixture of intaglio and non-intaglio data within any column, then computer 34 proceeds to determine and assign the feed rate $FR_2$ to those columns which correspond to intaglio data and the feed rate $FR_1$ to those columns which correspond solely to non-intaglio data using the feed rate buffer 34a mentioned earlier herein. The feed rates are stored in memory of computer 34. This procedure will now be described relative to FIGS. 28–29.

As alluded to earlier herein, if it is not desired to have a constant feed rate, than the feed rate may be varied on a column-by-column basis as desired.

Computer 34 begins at block 426 (FIG. 28) where a column feed rate buffer (not shown), which stores in computer 34 an assigned feed rate for each column of data in memory 34a, is cleared. This feed rate buffer will received and store an assigned feed rate for each column of intaglio and non-intaglio data being processed. Computer 34 then proceeds to decision block 428 where it is determined if an intaglio type engrave flag has been set. If it has, then computer 34 assigns the same intaglio feed rate for all data in the column. Thus, the routine proceeds to block 430 where computer 34 sets the feed rate for every column of data in the buffer to the same value (i.e., the first predetermined feed rate in the embodiment illustrated). Thereafter, the routine is complete and proceeds to the engraving block 386 in FIG. 24 as shown.

If the decision at decision block 428 (FIG. 28) is negative, then computer 34 scans each column of data at block 432 in accordance with the routine or means illustrated in FIG. 29 which will now be described. In this regard, the scanning column routine begins at block 434 where computer 34 sets the feed rate for the column to the first predetermined feed rate. The routine proceeds to block 436 where computer 34 sets a column index to the start position which corresponds to the first column being processed.

At block 438, computer 34 examines the image data to determine which type of data, non-intaglio or intaglio, the data value represents. At decision block 440, it is determined whether the flag which was previously set corresponds to an intaglio data value. If it does, then the routine proceeds to block 442 where computer 34 obtains the next image data value for processing. If the decision at decision block 440 is negative, then computer 34 sets the feed rate for the column to the non-intaglio predetermined feed rate $FR_2$ (block 448).

At decision block 444, computer 34 determines if all data items within the column being scanned have been processed. If they have not, then the routine loops back to block 438 as shown. If they have, then computer 34 determines whether the next column of data was the last column (block 448). If it was, then the routine is complete. If the decision at decision block 448 is negative, then the routine obtains the next column of data (block 450). Thereafter, the routine loops back to block 436 as shown.

Once each column is processed and assigned a feed rate in the manner described herein, the engraver and engraving system may begin engraving (block 386 in FIG. 24). In this regard, computer 34 performs the engraving procedure using the routine or procedure shown in FIGS. 30 and 31 which will now be described.

The engraving means or routine begins at block 452 (FIG. 30) where computer 34 sets a column counter to the start position which will correspond to the first column of data stored in memory of computer 34a. The routine continues to decision block 454 where it is determined whether the column count is equal to the maximum number of columns stored in memory. If it is, then each column has been processed and the routine is complete. If it does not, then the routine proceeds to a process column routine (block 456 in FIG. 30) which is shown in FIG. 31. After the processed column routine is performed, the routine proceeds to block 458 where the column counter is incremented so that the next column may be processed. The routine then loops back to decision block 454 as shown.

The process column routine (FIG. 31) begins at block 460 where computer 34 sets an index equal to zero as shown. At block 462, the feed rates which were previously stored by computer 34 as described above are output by computer 34 and used to energize drivers 39 (FIG. 1).

At decision block 464, it is determined whether the index equals a maximum predetermined index value, thereby indicating that the last data item within the column being processed has been processed. If it has, then the routine terminates and engraving is complete. If the decision at decision block 464 is negative, then the routine proceeds to block 466.

At block 466, computer 34 outputs the feed rate (i.e., either the first predetermined feed rate or the second predetermined feed rate) for the data value associated with the index location. This value is transmitted to drivers 34 which adjusts the rate at which engraving head 26 is driven across surface 12*a* of cylinder 12.

Computer 34 also outputs the image data value associated with that index location at block 468 to engraving head 26, thereby engraving surface 12*a* of cylinder 12 with the non-intaglio engraved area or intaglio engraved area, depending on the data item being processed. The routine proceeds to block 470 where the index is incremented and then loops back to decision block 464 as shown.

Thus, it should be appreciated that this system and method provide means for comingling or mixing engraving types. This system and method further facilitate providing improved engraving by enabling a user to engrave both non-intaglio engraved areas and intaglio engraved areas on the same workpiece. Advantageously, this system and method provides means for identifying and flagging the image data associated with those portions of an image or picture which are either non-intaglio or intaglio images. Because it may be desirable to engrave either the non-intaglio and intaglio engraved areas at different feed rates, the system and method also facilitate identifying and distinguishing the non-intaglio and intaglio data from each other so that different feed rates may be applied.

Moreover, this system and method provides means for engraving both non-intaglio and intaglio engraved areas on a single cylinder or workpiece such that the benefits of fine detail and line work achieved with engraving intaglio engraved areas may be combined with advantages of non-intaglio engraved areas realized in the past. Thus, for example, the benefits associated with engraving edges and line work associated with intaglio engraved areas in the manner described herein may be realized or combined with non-intaglio engraved areas of the type shown, for example, in FIGS. 6A and 6B.

It should be appreciated that other features of the invention may also be realized. For example, computer 34 could modify the criteria for determining whether a data value is either a non-intaglio or intaglio data value. Thus, for example, computer 34 may use a single feed rate where the data comprises a mixture of intaglio and non-intaglio data. The computer 34 may also selectively modify the data. For example, a 100% density area which may normally be labeled intaglio may be reassigned as non-intaglio.

While the method herein described, and the form of apparatus for carrying this method into effect, constitute preferred embodiments of this invention, it is to be understood that the invention is not limited to this precise method and form of apparatus. For example, it should be appreciated that the apparatus and method described herein may be used in conjunction with conventional gravure engraving such that a pattern of intaglio trenches engraved in accordance with this method and apparatus may be engraved or configured alone or in combination with gravure cells of the type used in the past. Thus changes may be made in either without departing from the scope of the invention, which is defined in the appended claims.

What is claimed is:

1. An engraver for engraving a cylinder with a mixed pattern comprising both intaglio engraved areas and non-intaglio engraved areas comprising:

a driver for rotatably driving the cylinder;

a controller for controlling the operation of the engraver and for generating an engraving signal for engraving said mixed engraved pattern; and an engraving head coupled to said controller for engraving said cylinder with said mixed engraved pattern in response to the engraving signal as said engraving head is being driven across said cylinder.

2. The engraver as recited in claim 1 wherein said controller comprises:

means for analyzing image data and to identify intaglio data and non-intaglio data in response thereto.

3. The engraver as recited in claim 2 wherein said controller comprises:

means for assigning a intaglio feed rate for said intaglio data and a non-intaglio feed rate for said non-intaglio data.

4. The engraver as recited in claim 3 wherein said intaglio feed rate is not less than 5 microns per revolution.

5. The engraver as recited in claim 4 wherein said intaglio feed rate is shorter than said non-intaglio feed rate.

6. The engraver as recited in claim 3 wherein at least one of said feed rates is not consistent.

7. The engraver as recited in claim 1 wherein said controller comprises determining means for determining if said portion of said data corresponds to either a portion of said intaglio engraved areas or a portion of said non-intaglio engraved areas and assigns either a intaglio feed rate or a non-intaglio feed rate, respectively, in response thereto.

8. The engraver as recited in claim 1 wherein said controller comprises segmenting means for examining image data for said mixed pattern and identifying from said image data either first image data associated with said intaglio engraved areas or second image data associated with said non-intaglio engraved areas.

9. The engraver as recited in claim 8 wherein said controller comprises analyzing means for analyzing said image data and assigning an intaglio feed rate if said image data comprises any of said first image data.

10. The engraver as recited in claim 8 wherein said controller comprises analyzing means for analyzing said image data and assigning a non-intaglio feed rate if said image data comprises only said second image data.

11. The engraver as recited in claim 9 wherein said controller comprises analyzing means for analyzing said image data and assigning a non-intaglio engraver feed rate if said image data comprises only said second image data.

12. The engraver as recited in claim 11 wherein said intaglio engraver feed rate is less than said non-intaglio engraver feed rate.

13. The engraver as recited in claim 8 wherein said intaglio engraver feed rate is greater than about 5 microns per revolution.

14. The engraver as recited in claim 1 wherein a portion of said intaglio engraved areas and a portion of said non-intaglio engraved area overlap.

15. The engraver as recited in claim 1 wherein said controller comprises determining means for determining if a portion of said data comprises a mixture of intaglio and non-intaglio engraved areas.

16. The engraver as recited in claim 1 wherein said engraving head comprises an engraving stylus.

17. A method for engraving a mixed pattern of intaglio engraved areas and non-intaglio engraved areas on a cylinder for use in a printing press for printing said mixed pattern comprising the steps of:

rotatably driving the cylinder;

generating an engraving signal corresponding to said mixed pattern; and engraving said mixed pattern on the cylinder in response to said engraving signal.

18. The method as recited in claim 17 wherein said engraving step comprises the step of:

performing said engraving step using an engraving head comprises an engraving stylus.

19. The method as recited in claim 17 wherein said method further comprises the steps of:

segmenting said image data into columns;

analyzing each column of image data to determine if a feed rate should be allowed to vary by column.

20. The method as recited in claim 19 wherein said method further comprises the step of:

assigning an intaglio feed rate if image data in said column of image data comprises data corresponding to a mixture of said non-intaglio engraved areas and intaglio engraved areas.

21. The method as recited in claim 17 wherein said method further comprises the step of:

generating an engraving signal comprising an intaglio portion and a non-intaglio portion.

22. The method as recited in claim 17 wherein said method further comprises the steps of:

generating an intaglio engraving signal;

generating a non-intaglio engraving signal.

23. The method as recited in claim 17 wherein said method further comprises the step of:

analyzing image data and identifying intaglio data associated with intaglio engraved areas and non-intaglio data associated with non-intaglio engraved areas.

24. The method as recited in claim 23 wherein said analyzing step further comprises the step of:

flagging data corresponding to said intaglio engraved areas as intaglio data and data corresponding to said non-intaglio data as non-intaglio engraved areas.

25. The method as recited in claim 24 wherein said method further comprises the step of:

determining a feed rate in response to said intaglio data and non-intaglio data.

26. The method as recited in claim 25 wherein said method further comprises the step of:

using at least one intaglio feed rate for engraving said intaglio engraved areas and at least one non-intaglio feed rate for said non-intaglio engraved areas.

27. The method as recited in claim 17 wherein said engraving step comprises the step of:

engraving a portion of said intaglio engraved areas and a portion of said non-intaglio engraved area overlap.

28. The method as recited in claim 17 wherein said method further comprises the step of:

assigning a intaglio feed rate to those portions of said mixed pattern which correspond to said intaglio engraved areas.

29. The method as recited in claim 17 wherein said method further comprises the step of:

analyzing image data in order to identify intaglio data and non-intaglio data.

30. The method as recited in claim 29 wherein said method further comprises the step of:

assigning either a intaglio feed rate or a non-intaglio feed rate to said intaglio data and said non-intaglio data, respectively.

31. The method as recited in claim 30 wherein said intaglio feed rate is less than said non-intaglio feed rate.

32. An engraver for engraving a cylinder with a mixed pattern comprising both intaglio engraved areas and non-intaglio engraved areas comprising:

a drive means for rotatably driving the cylinder;

a means for controlling the operation of the engraver and for generating an engraving signal for engraving said mixed engraved pattern; and an engraving means coupled to said controller for engraving said cylinder with said mixed engraved pattern in response to the engraving signal as said engraving head is being driven across said cylinder.

33. The engraver as recited in claim 32 wherein said controller means comprises determining means for determining if said portion of said data corresponds to either a portion of said intaglio engraved areas or a portion of said non-intaglio engraved areas and assigns either a intaglio feed rate or a non-intaglio feed rate, respectively, in response thereto.

34. The engraver as recited in claim 32 wherein said controller means comprises segmenting means for examining image data for said mixed pattern and identifying from said image data either first image data associated with said intaglio engraved areas or second image data associated with said non-intaglio engraved areas.

35. The engraver as recited in claim 34 wherein said controller means comprises analyzing means for analyzing said image data and assigning an intaglio engraver feed rate if said image data comprises any of said first image data.

36. The engraver as recited in claim 35 wherein said intaglio engraver feed rate is less than said non-intaglio engraver feed rate.

37. The engraver as recited in claim 34 wherein said intaglio engraver feed rate is greater than about 5 microns per revolution.

38. The engraver as recited in claim 32 wherein said controller means comprises determining means for determining if a portion of said data comprises a mixture of intaglio and non-intaglio engraved areas.

39. The engraver as recited in claim 32 wherein a portion of said intaglio engraved areas and a portion of said non-intaglio engraved area overlap.

40. The engraver as recited in claim 32 wherein said engraving head comprises an engraving stylus.

41. The engraver as recited in claim 32 wherein said feed rates is not consistent.

42. The engraver as recited in claim 32 wherein said controller means comprises:

analyzing means for analyzing image data and to identify intaglio data and non-intaglio data in response thereto.

43. The engraver as recited in claim 42 wherein said controller means comprises:

analyzing means for assigning a intaglio feed rate for said intaglio data and a non-intaglio feed rate for said non-intaglio data.

44. The engraver as recited in claim 43 wherein said intaglio feed rate is slower than said non-intaglio feed rate.

45. The engraver as recited in claim 43 wherein said intaglio feed rate is not less than 5 microns per revolution.

* * * * *